(12) United States Patent
Kouda et al.

(10) Patent No.: US 8,983,633 B2
(45) Date of Patent: Mar. 17, 2015

(54) ELECTRICAL EQUIPMENT CONTROL DEVICE, ELECTRICAL EQUIPMENT CONTROL METHOD AND ELECTRICAL EQUIPMENT

(75) Inventors: Tetsuya Kouda, Osaka (JP); Satoshi Tsujimura, Hyogo (JP); Naofumi Nakatani, Shiga (JP); Toshihisa Ikeda, Kyoto (JP); Yasuo Yoshimura, Shiga (JP); Kazunori Kurimoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 65 days.

(21) Appl. No.: 13/822,167

(22) PCT Filed: Oct. 6, 2011

(86) PCT No.: PCT/JP2011/005640
§ 371 (c)(1),
(2), (4) Date: Mar. 11, 2013

(87) PCT Pub. No.: WO2012/046455
PCT Pub. Date: Apr. 12, 2012

(65) Prior Publication Data
US 2013/0173440 A1      Jul. 4, 2013

(30) Foreign Application Priority Data

Oct. 8, 2010    (JP) ................................ 2010-228860

(51) Int. Cl.
*G05B 11/01* (2006.01)
*G05D 3/12* (2006.01)
(Continued)

(52) U.S. Cl.
CPC .......... *G06Q 30/04* (2013.01); *G06Q 30/0283* (2013.01); *G06Q 30/06* (2013.01);
(Continued)

(58) Field of Classification Search
CPC ...................................................... G06F 1/3203
USPC ................... 700/22, 286, 287, 288, 291–298
See application file for complete search history.

(56) References Cited

U.S. PATENT DOCUMENTS

| 6,906,617 B1 | 6/2005 | Van der Meulen |
| 7,216,021 B2 * | 5/2007 | Matsubara et al. ........... 700/295 |

(Continued)

FOREIGN PATENT DOCUMENTS

| CN | 1416629 A | 5/2003 |
| JP | 11-041808 A | 2/1999 |

(Continued)

OTHER PUBLICATIONS

International Search Report for International Application No. PCT/JP2011/005640, dated Dec. 13, 2011, 1 page.
(Continued)

*Primary Examiner* — Tejal Gami
*Assistant Examiner* — Ziaul Karim
(74) *Attorney, Agent, or Firm* — Brinks Gilson & Lione Chicago, IL

(57) ABSTRACT

An equipment control device has: a reception unit for receiving desired time information indicating a desired operation start time or a desired operation termination time, operation period information and electrical power information; a time-shift period setting unit for setting a time-shift period indicating a period which has a time range including the desired time information and during which the operation start time or the operation termination time of a household appliance is shiftable; an electrical power charge information acquisition unit for acquiring electrical power charge information; an operation time computing unit for computing the operation start time or the operation termination time, on the basis of which the electricity charge that is billed when the household appliance is operated within the time-shift period falls to or below a predetermined charge; and a transmission unit for transmitting the operation start time or the operation termination time to the household appliance.

7 Claims, 19 Drawing Sheets

(51) Int. Cl.
*G05D 5/00* (2006.01)
*G05D 9/00* (2006.01)
*G05D 11/00* (2006.01)
*G05D 17/00* (2006.01)
*G05D 23/00* (2006.01)
*G06Q 30/04* (2012.01)
*G06Q 30/02* (2012.01)
*G06Q 30/06* (2012.01)
*H02J 3/00* (2006.01)
*H02J 3/14* (2006.01)
*H02J 3/32* (2006.01)
*H02J 13/00* (2006.01)

(52) U.S. Cl.
CPC  *H02J 3/008* (2013.01); *H02J 3/14* (2013.01); *Y02B 70/3225* (2013.01); *Y02B 70/3266* (2013.01); *Y04S 20/222* (2013.01); *Y04S 20/224* (2013.01); *Y04S 20/242* (2013.01); *Y04S 50/10* (2013.01); *Y04S 50/14* (2013.01); *H02J 3/32* (2013.01); *H02J 13/0075* (2013.01); *H02J 2003/143* (2013.01); *H02J 2003/146* (2013.01); *Y02B 90/222* (2013.01); *Y02B 90/2653* (2013.01); *Y04S 20/12* (2013.01); *Y04S 40/126* (2013.01); *Y04S 50/12* (2013.01)

USPC ............ 700/22; 700/286; 700/287; 700/288; 700/291; 700/292; 700/293; 700/294; 700/295; 700/296; 700/297; 700/298

(56) References Cited

U.S. PATENT DOCUMENTS

| | | | | |
|---|---|---|---|---|
| 8,617,316 | B2 * | 12/2013 | Finch et al. | 134/18 |
| 2004/0024483 | A1 * | 2/2004 | Holcombe | 700/122 |
| 2005/0096753 | A1 * | 5/2005 | Arling et al. | 700/11 |
| 2010/0175719 | A1 * | 7/2010 | Finch et al. | 134/18 |
| 2011/0148390 | A1 * | 6/2011 | Burt et al. | 323/318 |
| 2011/0196547 | A1 * | 8/2011 | Park et al. | 700/296 |

FOREIGN PATENT DOCUMENTS

| | | |
|---|---|---|
| JP | 2007-124793 A | 5/2007 |
| JP | 2008-067473 A | 3/2008 |
| WO | WO 2011/142131 A1 | 11/2011 |

OTHER PUBLICATIONS

Office Action and Search Report, and partial translation thereof, in corresponding Chinese Application No. 201180045951.5, dated Sep. 3, 2014, 7 pages.

* cited by examiner

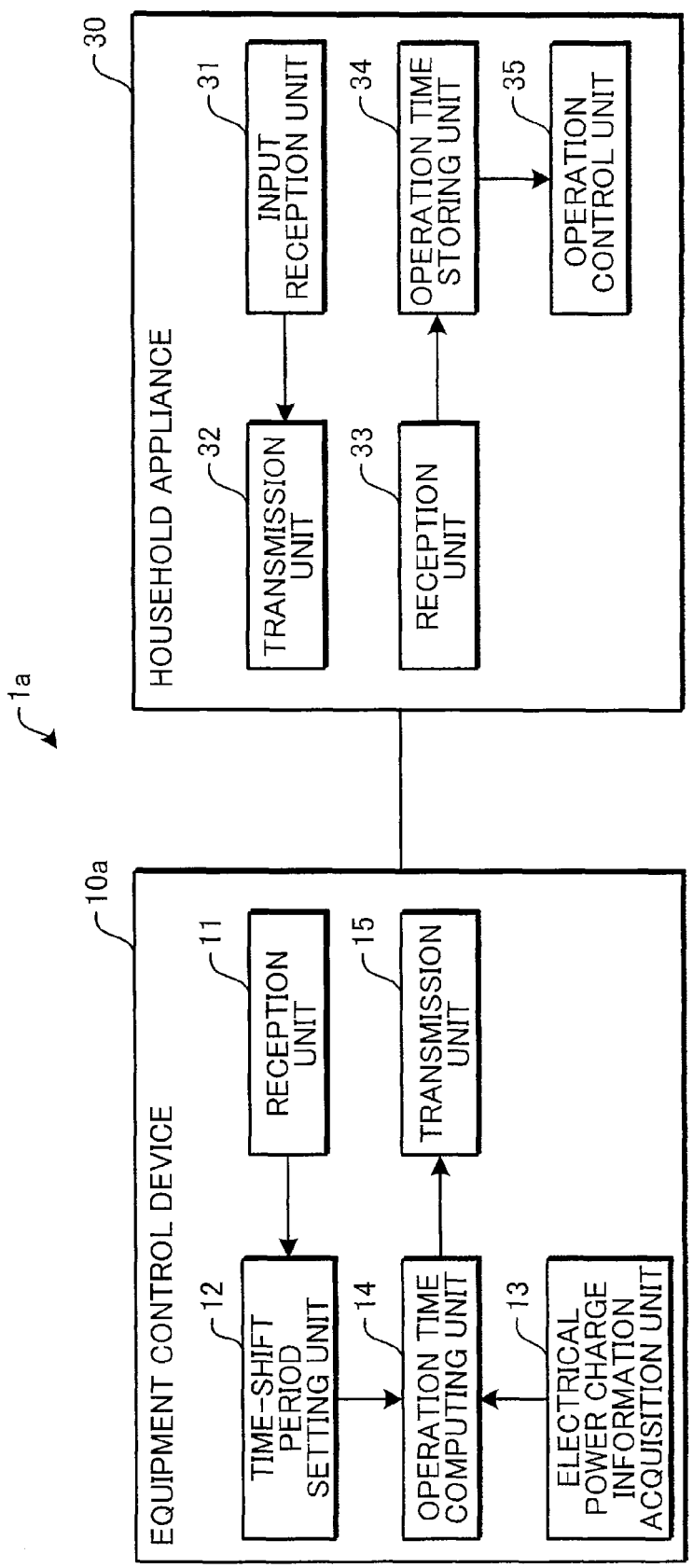

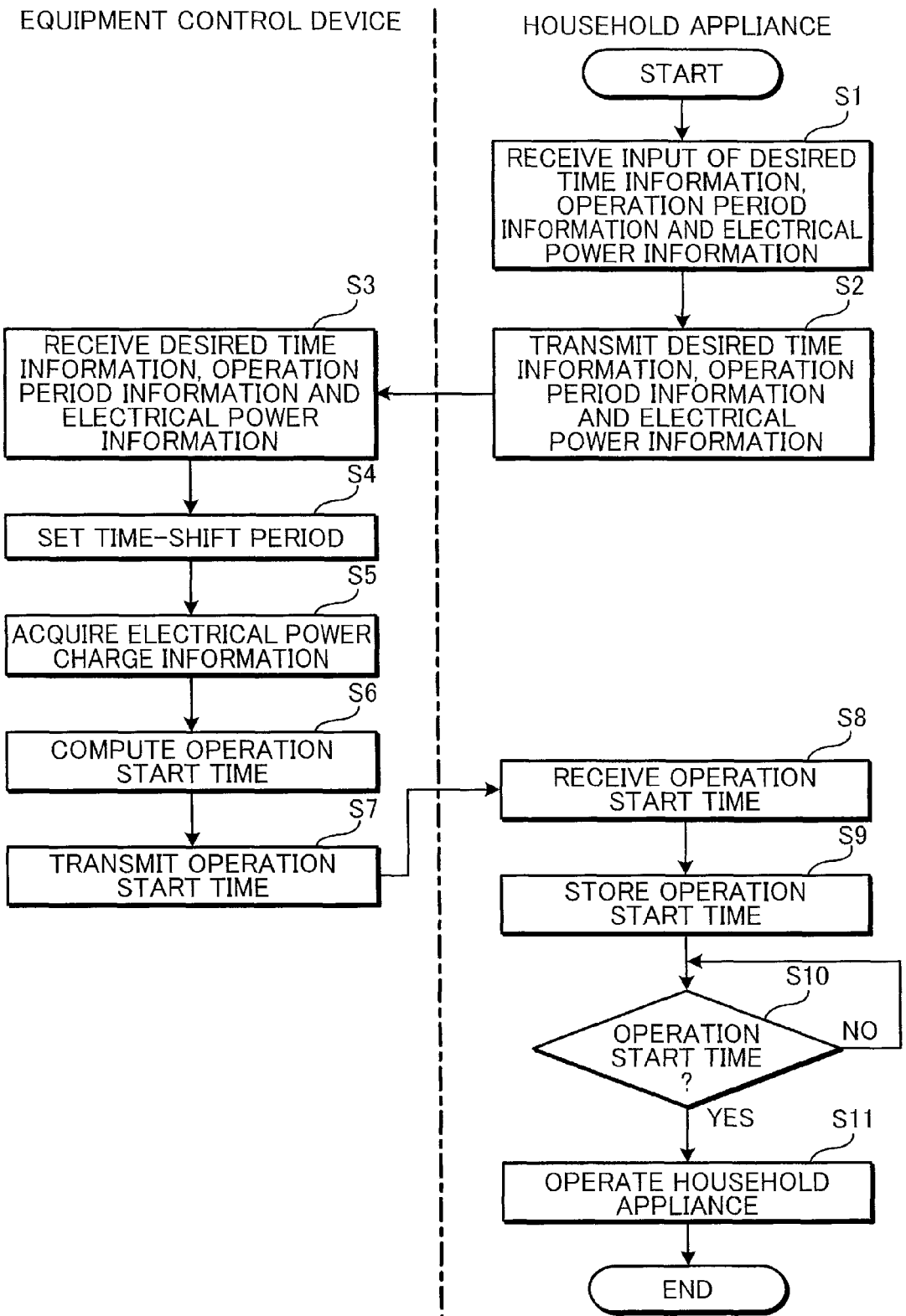

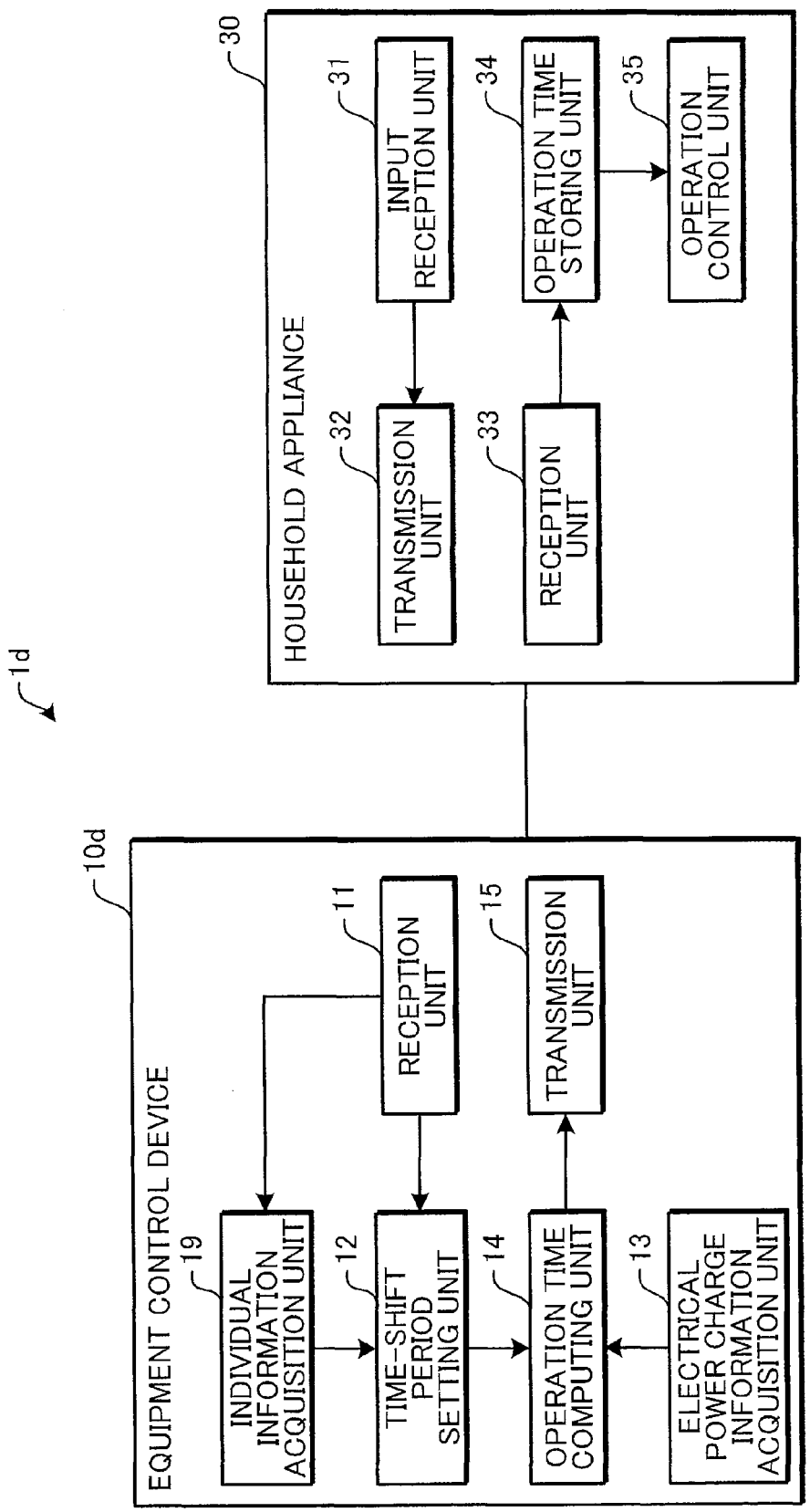

FIG.17

| TYPE | TIME-SHIFT PERIOD | TIME-SHIFT PATTERN | WEIGHTING FUNCTION |
|---|---|---|---|
| WASHER-DRIER | ±1 HOUR | FIRST TIME-SHIFT PATTERN | FIRST WEIGHTING FUNCTION |
| HOT WATER DISPENSER | −1 HOUR | SECOND TIME-SHIFT PATTERN | SECOND WEIGHTING FUNCTION |
| RICE COOKER | −1 HOUR | SECOND TIME-SHIFT PATTERN | SECOND WEIGHTING FUNCTION |
| COFFEE MACHINE | +0.5 HOURS | THIRD TIME-SHIFT PATTERN | THIRD WEIGHTING FUNCTION |

ELECTRICAL EQUIPMENT CONTROL DEVICE, ELECTRICAL EQUIPMENT CONTROL METHOD AND ELECTRICAL EQUIPMENT

This application is a 371 application of PCT/JP2011/005640 having an international filing date of Oct. 6, 2011, which claims priority to JP2010-228860 filed Oct. 8, 2010, the entire contents of which are incorporated herein by reference.

TECHNICAL FIELD

The present invention relates to an electrical equipment control device, an electrical equipment control method and an electrical equipment which control the operation start time or the operation termination time of an electrical equipment.

BACKGROUND ART

Conventionally, proposed is an electrical power load leveling system which presents a time period where the power supply load of the electric power company is lowest in the day, and urging the respective utility customers to use electrical power during that time period (for instance, refer to Patent Literature 1).

In the foregoing electrical power load leveling system, it is described that the bottom electrical power of the power demand can be increased by presenting the time period (electricity usage recommended time) where the power supply load is the lowest in the day, and urging the respective utility customers to use electrical power during that time period. Moreover, it is further described that the reduction in the peak electrical power can also be expected, and the overall leveling of the power supply load can be achieved.

Moreover, it is further described that, as a result of leveling the load, this will lead to the electric power company being able to cut costs required for controlling the electric-generating capacity of the power supply in accordance with the power demand and, therefore, in addition to presenting the electricity usage recommended time, if a discount of the electricity charge is also offered during that time, it is expected that the electrical power users as the utility customers will intentionally use electrical power which is inexpensive during that time, and the leveling of power demand can be performed even more effectively.

As one example, in households, electrical water heaters and heat pump water heaters that boil water based on late-night electricity contracts and time period-based electric light contracts for leveling the daily power demand are already in widespread use. Hot water that was boiled using inexpensive electrical power of late night of the previous day (for example, from 11 PM to 7 AM) is stored in a hot water tank, and this hot water is used for meals, showers and bathing during the day, morning or night. Consequently, the power demand for boiling water is shifted to the time period of late night of the previous day.

These electrical water heaters and heat pump water heaters that are compatible with late-night electrical power have a clock means build therein, and starts the water-boiling operation upon reaching the time that was set in advance in the contract with the electric power company. In other words, these electrical water heaters and heat pump water heaters perform reservation operation at the pre-set operation start time (or operation termination time) on a daily basis.

In the future, it is considered that natural energy generation systems such as solar power generation systems and wind power generation systems will become widespread, and it is anticipated that, with these natural energy generation systems, the electric-generating capacity will change considerably depending on the weather and time.

Such being the case, technology for controlling the power demand will become even more important in the future. In addition to the conventional system of leveling the power demand and consequently controlling the electric-generating capacity, it is considered that a new system capable of controlling the power demand in accordance with the fluctuating electric-generating capacity will become required.

For example, the electric power company will be able to control the power demand according to the fluctuating electric-generating capacity by varying the electricity charge according to the fluctuating electric-generating capacity, and reducing the electricity charge when the electric-generating capacity is great and increasing the electricity charge when the electric-generating capacity is small.

Thus, proposed is an electrical equipment control system for controlling an electrical equipment via a home server (for instance, refer to Patent Literature 2). This control system comprises a home service which controls the electrical equipment by comparing the operating conditions of a plurality of electrical equipment and pre-stored conditions and calculating the ideal operation pattern, and an electrical equipment that is operated based on the ideal operation pattern according to the control of the home server.

In addition, with this control system, the electricity charge menu provided from the electric power company (electrical power supplier) is stored in home server so that the electrical equipment will be operated during the time period offering an inexpensive electricity charge as the ideal operation pattern, compares and computes this with the pre-input operating conditions, and operates the washer-drier, rice cooker, hot water dispenser and the like during the time period offering an inexpensive electricity charge.

Meanwhile, in areas where the use of solar power generation systems and wind power generation systems is widespread, there are countries that are adopting the real-time pricing system.

While a late-night electricity contract reduces the electricity charge during a given time period from 11 PM to 7 AM on a daily basis, in real-time pricing, the electrical power charge fluctuates in real-time in accordance with the electric-generating capacity of the solar power generation system or the wind power generation system, and the electricity charge will vary from day to day even during the same time period.

For example, electricity charge information (table showing the time period and electricity charge) in which the electricity charge is increased or decreased hour to hour is distributed from the electric power company to the utility customers. The frequency of distributing the electricity charge information is, for example, as follows: the electricity charge information of the following day is distributed on the current day. Otherwise, the electricity charge information of the afternoon of the current day is distributed during the morning of the current day. The user operates the electrical equipment by referring to this electricity charge information.

Nevertheless, since foregoing Patent Literature 1 does not give any consideration to this real-time pricing, there is a possibility that the user's convenience will be impaired if the household appliance is to be operated upon selecting the time period offering an inexpensive electricity charge based on the electricity charge information or the electricity charge menu provided by the electric power company.

For example, the electricity charge can be reduced by operating the electrical equipment during the time period offering an inexpensive electricity charge as in Patent Literature 1. When this system is adapted to the electricity charge information which frequently changes as with real-time pricing, the operation time of the electrical equipment will change each time the time period offering an inexpensive electricity charge changes. Consequently, there is a possibility that the user will not know when the operation will finish.

For instance, with a clothes washer-drier, there may be cases where the drying is finished sooner than the user had expected, whereby the fluffiness of the clothes may be lost or, with a rice cooker, there may be cases where the cooking of the rice is finished sooner than the user had expected, and the flavor of rice may deteriorate while the rice is being kept warm.

CITATION LIST

Patent Literature

Patent Literature 1: Japanese Patent Application Publication No. 2007-124793
Patent Literature 2: Japanese Patent Application Publication No. 2008-067473

SUMMARY OF THE INVENTION

The present invention was devised to resolve the foregoing problems, and an object of this invention is to provide an electrical equipment control device, an electrical equipment control method and an electrical equipment capable of seeking the optimal solution within the following two conditions; namely, to lower the electricity charge as much as possible (user's economic efficiency) and to operate the electrical equipment at a time that is closest to the operation termination time desired by the user (user's convenience) upon referring to the electricity charge information provided by the electric power company (electrical power supplier) and operating the electrical equipment.

The electrical equipment control device according to one aspect of the present invention comprises a reception unit for receiving desired time information indicating a desired operation start time or a desired operation termination time of an electrical equipment desired by a user, operation period information indicating a period required for operation by the electrical equipment, and electrical power information indicating an electrical power required for operation by the electrical equipment, a time-shift period setting unit for setting a time-shift period indicating a period which has a time range including the desired time information received by the reception unit and during which the operation start time or the operation termination time of the electrical equipment is shiftable, an electrical power charge information acquisition unit for acquiring electrical power charge information indicating an electrical power charge that changes hour to hour, an operation time computing unit for computing, based on the desired time information, the operation period information and the electrical power information received by the reception unit and the electrical power charge information acquired by the electrical power charge information acquisition unit, the operation start time or the operation termination time, on the basis of which the electricity charge that is billed when the electrical equipment is operated within the time-shift period set by the time-shift period setting unit falls to or below a predetermined charge, and a transmission unit for transmitting, to the electrical equipment, the operation start time or the operation termination time computed by the operation time computing unit.

According to the foregoing configuration, the reception unit receives desired time information indicating a desired operation start time or a desired operation termination time of an electrical equipment desired by a user, operation period information indicating a period required for operating the electrical equipment, and electrical power information indicating an electrical power required for operating the electrical equipment. The time-shift period setting unit sets a time-shift period indicating a period which has a time range including the desired time information received by the reception unit and during which the operation start time or the operation termination time of the electrical equipment is shiftable. The electrical power charge information acquisition unit acquires electrical power charge information indicating an electrical power charge that changes hour to hour. In addition, the operation time computing unit computes, based on the desired time information, the operation period information and the electrical power information received by the reception unit and the electrical power charge information acquired by the electrical power charge information acquisition unit, the operation start time or the operation termination time where the electricity charge that is billed when the electrical equipment is operated within the time-shift period set by the time-shift period setting unit will fall below a predetermined charge. The transmission unit transmits, to the electrical equipment, the operation start time or the operation termination time computed by the operation time computing unit.

According to the present invention, since the time-shift period has a time range including the desired time information indicating the desired operation start time or the desired operation termination time, the time-shift period is set to shift the operation start time or the operation termination time of the electrical equipment within the scope of its time range, and the operation start time or the operation termination time where the electricity charge that is billed when the electrical equipment is operated within the time-shift period set by the time-shift period setting unit will fall below a predetermined charge is computed. Consequently, a time-shift period exceeding the user's allowable range will no longer be set, and the user can enjoy the advantages of convenience and economic efficiency.

The object, features and advantages of the present invention will become more apparent from the ensuing detailed explanation and appended drawings.

BRIEF DESCRIPTION OF THE DRAWINGS

FIG. 1 is a diagram showing the configuration of the equipment control system according to Embodiment 1 of the present invention.

FIG. 2 is a flowchart explaining the operation of the equipment control system in Embodiment 1.

FIG. 14 is a diagram showing the configuration of the equipment control system according to Embodiment 4 of the present invention.

FIG. 17 is a diagram showing an example of the table data.

DESCRIPTION OF EMBODIMENTS

Figure 3A:
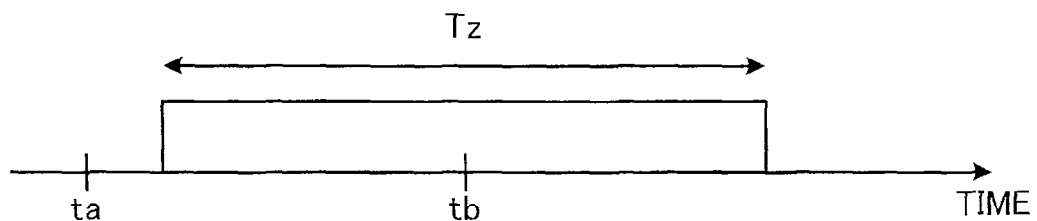
FIG. 3A is a schematic diagram explaining an example of the time-shift period having a predetermined time range before and after the desired operation termination time.

Embodiments of the present invention are now explained with reference to the appended drawings. Note that the ensuing embodiments are merely examples that embody the present invention, and are not intended to limit the technical scope of the present invention.

(Embodiment 1)

FIG. 1 is a diagram showing the configuration of the equipment control system according to Embodiment 1 of the present invention. The equipment control system 1a shown in FIG. 1 comprises an equipment control device 10a and a household appliance 30.

The household appliance 30 is, for example, a washer-drier, a rice cooker, an electric water heater, a dish washer or the like.

The equipment control device 10a and the household appliance 30 are connected via a wireless or wired home network to enable the mutual transmission and reception of information. Note that, while only one household appliance 30 is connected to the equipment control device 10a in FIG. 1, the present invention is not particularly limited thereto, and a plurality of household appliances may also be connected to the equipment control device 10a.

The household appliance 30 comprises an input reception unit 31, a transmission unit 32, a reception unit 33, an operation time storing unit 34 and an operation control unit 35. The equipment control device 10a comprises a reception unit 11, a time-shift period setting unit 12, an electrical power charge information acquisition unit 13, an operation time computing unit 14 and a transmission unit 15.

The input reception unit 31 of the household appliance 30 is, for example, an input terminal comprising an operation screen and the like, and receives information input by the user. The input reception unit 31 receives desired time information indicating a desired operation termination time of the household appliance 30 desired by the user, operation period information indicating a period required for operating household appliance 30, and electrical power information indicating an electrical power required for operating the household appliance 30. Note that, in this Embodiment, while the input reception unit 31 only receives the input of the desired operation termination time of the household appliance 30 from the user, the present invention is not particularly limited thereto, and the configuration may also be such that only the input of the desired operation start time of the household appliance 30 is received, or both inputs of the desired operation termination time and the desired operation start time of the household appliance 30 are received. The input reception unit 31 outputs the desired time information, the operation period information and the electrical power information to the transmission unit 32.

The transmission unit 32 transmits, to the equipment control device 10a, the desired time information indicating the desired operation termination time of the household appliance 30 desired by the user, the operation period information indicating the period required for operating household appliance 30, and the electrical power information indicating the electrical power required for operating the household appliance 30. Note that, rather than transmitting the desired time information only indicating the desired operation termination time to the equipment control device 10a, the transmission unit 32 may also transmit the desired time information only indicating the desired operation start time to the equipment control device 10a, or transmit the desired time information indicating both the desired operation termination time and the desired operation start time to the equipment control device 10a.

The reception unit 11 of the equipment control device 10a receives the desired time information indicating the desired operation termination time of the household appliance 30 desired by the user, the operation period information indicating the period required for operating household appliance 30, and the electrical power information indicating the electrical power required for operating the household appliance 30. Note that, rather than receiving the desired time information only indicating the desired operation termination time, the reception unit 11 may also receive the desired time information only indicating the desired operation start time, or receive the desired time information indicating both the desired operation termination time and the desired operation start time.

The time-shift period setting unit 12 sets a time-shift period indicating a period which has a time range including the desired time information received by the reception unit 11 and during which the operation start time or the operation termination time of the household appliance 30 is shiftable. For example, the time-shift period setting unit 12 sets a time-shift period having a time range of 2 hours before and after the desired operation termination time based thereon.

The electrical power charge information acquisition unit 13 acquires electrical power charge information indicating an electrical power charge that changes hour to hour. The electrical power charge information is provided, for example, from the electric power company. The electrical power charge information acquisition unit 13 acquires, for example, the current day's electrical power charge information on the previous day, and stores the acquired electrical power charge information in an internal memory. The electrical power charge information represents the fluctuation of the electrical power charge per 1 kWh of a 24-hour period. The electrical power charge fluctuates, for example, according to the time hour to hour. This is in reflection of real-time pricing in which the electricity charge changes in real-time as a result power sources such as solar cells and fuel cells or storage batteries being installed in homes with household appliances, whereby the system for supplying electricity to households will change considerably.

Generally speaking, real-time pricing indicates the electrical power charge information that is notified by the electric power company in advance. Moreover, in addition to the electrical power charge information from the electric power company, there are cases where real-time pricing also indicates electrical power charge information created from the past performance of equipment operation information of the power sources and storage batteries in the household, and information on the purchase and sale of electrical power charges.

As described above, the electrical power charge information may be electrical power charge information that accommodates only a specific household that is created from the past performance of equipment operation information, and information on the purchase and sale of electrical power charges in addition to the electrical power charge information from the electric power company. In other words, the method of acquiring this information is irrelevant so as long as the electrical power charge which changes depending on the time can be known.

The operation time computing unit 14 computes, based on the desired time information, the operation period information and the electrical power information received by the reception unit 11 and the electrical power charge information acquired by the electrical power charge information acquisition unit 13, the operation start time where the electricity charge that is billed when the household appliance 30 is operated within the time-shift period set by the time-shift period setting unit 12 will fall below a predetermined charge. Note that the operation time computing unit 14 may compute only the operation termination time rather than computing only the operation start time, or may compute both the operation start time and the operation termination time.

The transmission unit 15 transmits, to the household appliance 30, the operation start time computed by the operation time computing unit 14. Note that the transmission unit 15 may transmit only the operation termination time rather than transmitting only the operation start time, or may transmit both the operation start time and the operation termination time.

The reception unit 33 of the household appliance 30 receives the operation start time transmitted by the equipment control device 10a. Note that the reception unit 33 may receive only the operation termination time rather than receiving only the operation start time, or may receive both the operation start time and the operation termination time.

The operation time storing unit 34 stores the operation start time received by the reception unit 33. The operation control unit 35 controls the operation of the household appliance 30 based on the operation start time stored in the operation time storing unit 34. In other words, the operation control unit 35 performs control of outputting a start signal when the current time becomes the operation start time stored in the operation time storing unit 34, and starting the operation of the household appliance 30.

Note that, when the operation time storing unit 34 is storing the operation termination time, the operation control unit 35 performs control of determining the operation start time so that the operation will end at the operation termination time stored in the operation time storing unit 34, outputting a start signal when the current time becomes the determined operation start time, and starting the operation of the household appliance 30.

The operation of the equipment control system in Embodiment 1 is now explained.

FIG. 2 is a flowchart explaining the operation of the equipment control system in Embodiment 1.

Foremost, in step S1, the input reception unit 31 of the household appliance 30 receives the input of the desired time information indicating the desired operation termination time of the household appliance 30 desired by the user, the operation period information indicating the period required for operating household appliance 30, and the electrical power information indicating the electrical power required for operating the household appliance 30. The desired operation termination time represents the operation termination time of the household appliance 30 desired by the user. For example, the user inputs the desired operation termination time of the household appliance 30. Note that the user inputs an actual desired operation termination time such as "18:00". Otherwise, the user inputs how many hours later from the current time the operation should be ended; for instance, "8 hours later". The input reception unit 31 outputs the actual desired operation termination time to the transmission unit 32. When how many hours later from the current time the operation should be ended, the input reception unit 31 calculates the actual desired operation termination time and outputs the result to the transmission unit 32.

Moreover, the information that is input by the user using the input reception unit 31 is the desired operation termination time, the operation period information indicating the period required for operating household appliance 30, and the electrical power information indicating the electrical power required for operating the household appliance 30. Nevertheless, if the input reception unit 31 can receive the input of the operating condition from the user as well as identify the desired operation termination time, the operation period information and the electrical power information based on the received operating condition, there is no need for the user to input the desired operation termination time, the operation period information and the electrical power information.

For example, if the household appliance 30 is a washer-drier, as a result of the wash program (standard program, power-saving program, time-saving program or the like) being selected by the input reception unit 31, the operation period information and the electrical power information corresponding to that wash program can be identified and, therefore, there is no need for the user to input the operation period information and the electrical power information. In other words, so as long as the desired operation termination time, the operation period information and the electrical power information can be identified based on some type of input information, there is no need for the user to input the individual information.

Moreover, the household appliance 30 may also store, in an internal memory, the various types of information that were input by the input reception unit 31. Here, if the input by the input reception unit 31 is information which requires changes to the operating condition of the wash program or the like, the input reception unit 31 stores in advance a conversion table which sets forth the desired operation termination time, the operation period information and the electrical power information corresponding to that wash program.

In particular, if the household appliance 30 is a washer-drier, since a plurality of processes (for instance, washing process, dewatering process, drying process and the like) are sequentially performed during the operation, the operation period information and the electrical power information become complicated. The input reception unit 31 stores a plurality of pieces of electrical power information for each wash program, amount of laundry, and sensor result of outside temperature or the like.

Subsequently, in step S2, the transmission unit 32 transmits the desired time information, the operation period information and the electrical power information to the equipment control device 10a.

Subsequently, in step S3, the reception unit 11 of the equipment control device 10a receives the desired time information, the operation period information and the electrical power information transmitted from the transmission unit 32 of the household appliance 30. The reception unit 11 outputs the received desired time information, operation period information and electrical power information to the time-shift period setting unit 12.

Subsequently, in step S4, the time-shift period setting unit 12 sets a time-shift period having a time range including the desired time information received by the reception unit 11. For example, the time-shift period setting unit 12 sets a time-shift period having a time range of 2 hours before and after the desired operation termination time based thereon. The time range of the time-shift period is predetermined, and the time-shift period stored in the internal memory of the equipment control device 1a is read by the time-shift period setting unit 12.

Note that, in this embodiment, while the time-shift period has a time range of 2 hours before and after the desired operation termination time, the invention is not particularly limited thereto, and the optimal time range may be set according to the type of household appliance 30. For example, the time-shift period is preferably around 2 to 4 times the time required for operating the household appliance 30.

Figure 3B:
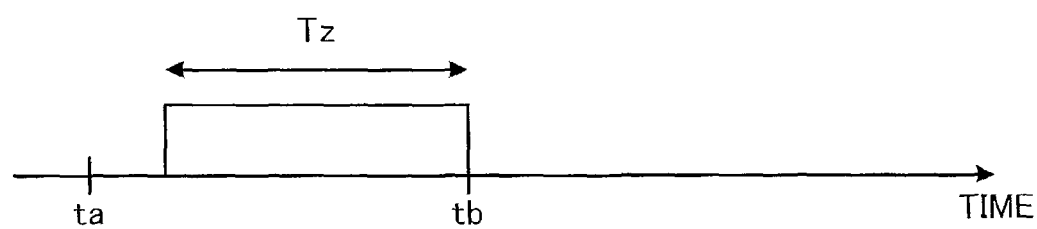
FIG. 3B is a schematic diagram explaining an example of the time-shift period including the desired operation termination time and having a predetermined time range before the desired operation termination time.
Figure 3C:
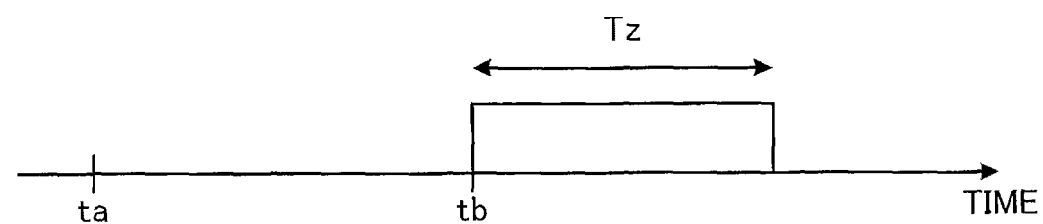
FIG. 3C is a schematic diagram explaining an example of the time-shift period including the desired operation termination time and having a predetermined time range after the desired operation termination time.

Various examples of the time-shift period are now explained. FIG. 3A to FIG. 3C are schematic diagrams explaining various examples of the time-shift period. FIG. 3A is a schematic diagram explaining an example of the time-shift period having a predetermined time range before and after the desired operation termination time, FIG. 3B is a schematic diagram explaining an example of the time-shift period including the desired operation termination time and having a predetermined time range before the desired operation termination time, and FIG. 3C is a schematic diagram explaining an example of the time-shift period including the desired operation termination time and having a predetermined time range after the desired operation termination time.

For example, if the household appliance 30 is a washer-drier, it is anticipated that the laundry will be folded in the evening, and a time-shift period Tz having a time range of 1 hour before and after the desired operation termination time tb is set (refer to FIG. 3A). Moreover, if the household appliance 30 is a rechargeable vacuum cleaner, it is anticipated that the house will be vacuumed in one's spare time in the evening, and a time-shift period Tz having a time range of 2 hours before and after the desired operation termination time tb is set (refer to FIG. 3A).

Moreover, if the household appliance 30 is a hot water dispenser, it is anticipated that the hot water will be used in the meal preparation, and a time-shift period Tz having a time range of 1 hour before the desired operation termination time tb is set (refer to FIG. 3B). Moreover, if the household appliance 30 is a dish washer, it is anticipated that dishes will be used for the meal, and a time-shift period Tz having a time range of 0.25 hours before the desired operation termination time tb is set (refer to FIG. 3B). Moreover, if the household appliance 30 is a home bakery, it is anticipated that bread will be served for the meal, and a time-shift period Tz having a time range of 1 hour before the desired operation termination time tb is set (refer to FIG. 3B). Moreover, if the household appliance 30 is a rice cooker, it is anticipated that rice will be served for the meal and that time for steaming the cooked rice will be secured, and a time-shift period Tz having a time range of 1 hour before the desired operation termination time tb is set (refer to FIG. 3B).

In addition, if the household appliance 30 is a coffee machine, it is anticipated that coffer will be served after the meal, and a time-shift period Tz having a time range of 0.5 hours after the desired operation termination time tb is set (refer to FIG. 3C).

Returning to FIG. 2, subsequently, in step S5, the electrical power charge information acquisition unit 13 acquires the electrical power charge information showing the electrical power charge that changes hour to hour. Note that, while the electrical power charge information acquisition unit 13 reads the electrical power charge information that is pre-stored in the internal memory, the present invention is not particularly limited thereto, and, when the time-shift period is set by the time-shift period setting unit 12, the electrical power charge information acquisition unit 13 may access an external server operated by the electric power company and acquire the electrical power charge information from the external server.

Subsequently, in step S6, the operation time computing unit 14 computes, based on the desired time information, the operation period information and the electrical power information received by the reception unit 11 and the electrical power charge information acquired by the electrical power charge information acquisition unit 13, the operation start time where the electricity charge that is billed when the household appliance 30 is operated within the time-shift period set by the time-shift period setting unit 12 will fall below a predetermined charge. More specifically, the operation time computing unit 14 computes, based on the desired time information, the operation period information, the electrical power information and the electrical power charge information, the operation start time where the electricity charge that is billed when the household appliance 30 is operated within the time-shift period becomes least expensive. The operation time computing unit 14 outputs the computed operation start time to the transmission unit 15.

Figure 4:
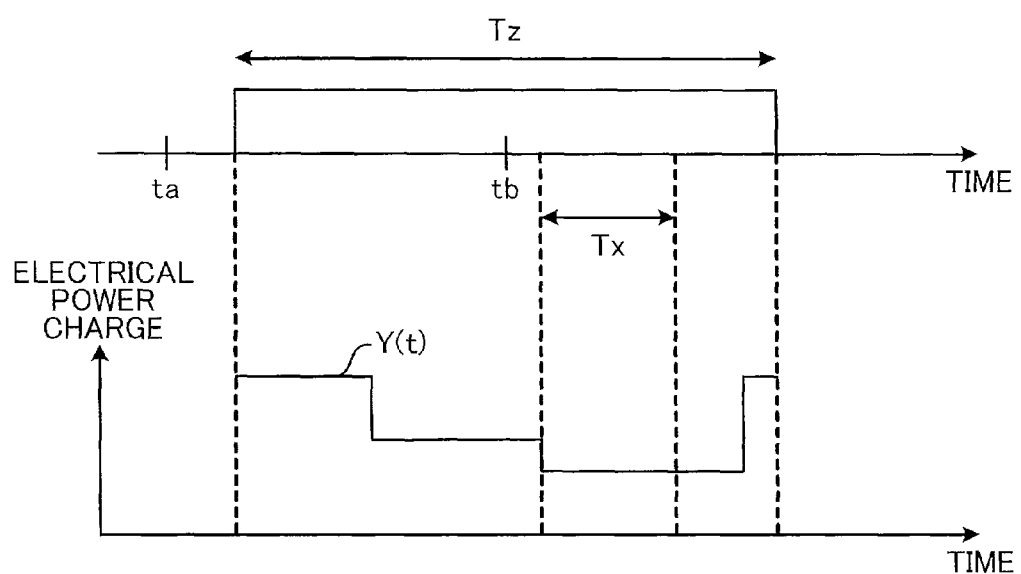
FIG. 4 is a schematic diagram explaining the time-shift period and the operation period in Embodiment 1 of the present invention.

FIG. 4 is a schematic diagram explaining the time-shift period and the operation period in Embodiment 1 of the present invention.

In the top diagram of FIG. 4, the horizontal axis represents the time, and in the bottom diagram of FIG. 4, the horizontal axis represents the time and the vertical axis represents the electrical power charge Y(t) (JPY/kWh).

At the current time ta, when the input reception unit 31 receives the input of the desired time information indicating the desired operation termination time tb, the time-shift period setting unit 12 sets the time-shift period Tz having a time range that is 2 hours before and after the desired operation termination time tb based thereon.

Subsequently, the operation time computing unit 14 computes, based on the desired time information, the operation period information, the electrical power information and the electrical power charge information (electrical power charge Y(t)), the operation period Tx where the electricity charge that is billed when the household appliance 30 is operated within the time-shift period Tz becomes least expensive, and computes the operation start time based on the operation period Tx. The operation time computing unit 14 calculates the electricity charge that is billed when the household appliance 30 is operated based on the following Formula (I). In other words, the operation time computing unit 14 can calculate the electricity charge that is billed by taking the integral of the value obtained by multiplying the time period-based electrical power charge Y(t) by the electrical power P(t) required to operate the household appliance 30 with respect to the operation period from the operation start time t1 to the operation termination time t2 in the time-shift period.

[Formula 1]

$$\text{Electricity charge} = \int_{t1}^{t2} \{Y(t) \cdot P(t)\} dt \quad (1)$$

Note that there may be cases where the electrical power P(t) is determined based on a factor other than time such as when the electricity charge is determined based on the peak electrical power of a specific period. Moreover, when a plurality of operation periods Tx where the electricity charge becomes least expensive are extracted, the operation time computing unit 14 selects the operation period Tx in which the operation termination times is closest to the desired operation termination time among the plurality of operation periods Tx.

Returning to FIG. 2, subsequently, in step S7, the transmission unit 15 transmits the operation start time computed by the operation time computing unit 14 to the household appliance 30.

Subsequently, in step S8, the reception unit 33 of the household appliance 30 receives the operation start time transmitted by the transmission unit 15 of the equipment control device 10*a*. The reception unit 33 outputs the received operation start time to the operation time storing unit 34.

Subsequently, in step S9, the operation time storing unit 34 stores the operation start time received by the reception unit 33.

Subsequently, in step S10, the operation control unit 35 determines whether the current time has reached the operation start time stored in the operation time storing unit 34. When it is determined that the current time has not reached the operation start time stored in the operation time storing unit 34 (step S10; NO), the process enters a standby state, and the determination processing of step S10 is repeated at a predetermined timing until the current time reaches the operation start time stored in the operation time storing unit 34.

Meanwhile, when it is determined that the current time has reached the operation start time stored in the operation time storing unit 34 (step S10; YES), in step S11, the operation control unit 35 starts the operation of the household appliance 30. Note that, when the operating condition is input by the input reception unit 31, the operation control unit 35 operates the household appliance 30 according to the operating condition.

As described above, since the time-shift period has a time range including the desired time information indicating the desired operation start time or the desired operation termination time, the time-shift period is set to shift the operation start time or the operation termination time of the household appliance 30 within the scope of its time range, and the operation start time or the operation termination time where the electricity charge that is billed when the household appliance 30 is operated within the time-shift period set by the time-shift period setting unit will fall below a predetermined charge is computed. Consequently, a time-shift period exceeding the user's allowable range will no longer be set, and the user can enjoy the advantages of convenience and economic efficiency.

(Embodiment 2)

Figure 5:
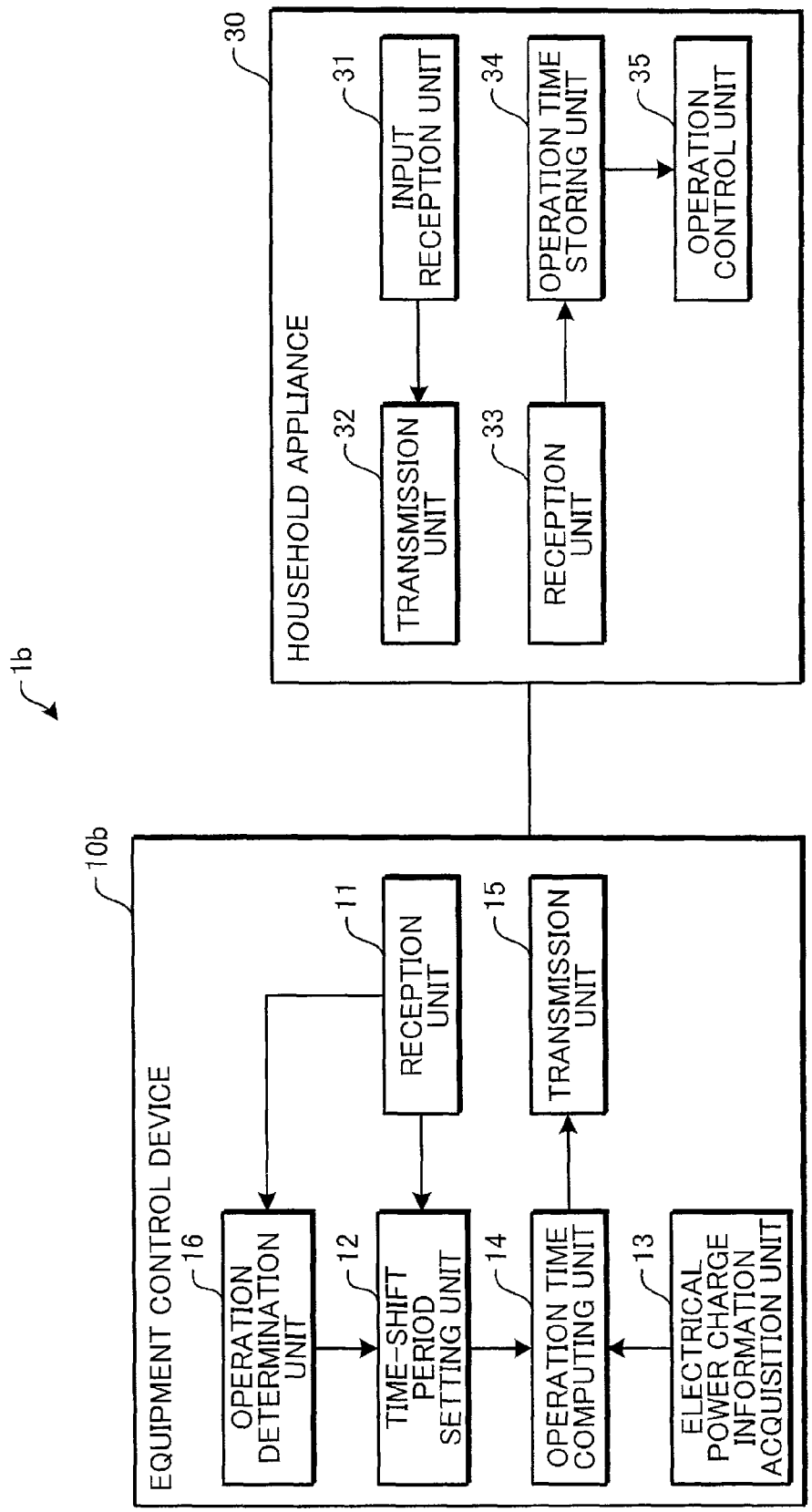
FIG. 5 is a diagram showing the configuration of the equipment control system according to Embodiment 2 of the present invention.

The equipment control system according to Embodiment 2 is now explained. FIG. 5 is a diagram showing the configuration of the equipment control system according to Embodiment 2 of the present invention. The equipment control system 1*b* shown in FIG. 5 comprises an equipment control device 10*b* and a household appliance 30.

The household appliance 30 comprises an input reception unit 31, a transmission unit 32, a reception unit 33, an operation time storing unit 34 and an operation control unit 35. The equipment control device 10*b* comprises a reception unit 11, a time-shift period setting unit 12, an electrical power charge information acquisition unit 13, an operation time computing unit 14, a transmission unit 15 and an operation determination unit 16. Note that, in the equipment control system 1*b* according to Embodiment 2, explanation of the same configurations as the equipment control system 1*a* according to Embodiment 1 is omitted, and only the different configurations will be explained.

The transmission unit 32 of the household appliance 30 transmits to the equipment control device 10*b*, together with the desired time information, the operation period information and the electrical power information, state retention electrical power information indicating whether the household appliance 30 will consume the state retention electrical power for retaining the post-operating state and indicating the state retention electrical energy to be consumed by the household appliance 30 for retaining the post-operating state. Note that the state retention electrical power information is pre-stored in the memory of the household appliance 30. Upon transmitting the desired time information, the operation period information and the electrical power information to the equipment control device 10*b*, the transmission unit 32 reads the state retention electrical power information from the memory.

The reception unit 11 of the equipment control device 10*b* receives the desired time information, the operation period information, the electrical power information and the state retention electrical power information transmitted by the transmission unit 32 of the household appliance 30.

Based on the state retention electrical power information received by the reception unit 11, the operation determination unit 16 determines whether the household appliance 30 will consume the state retention electrical power for retaining the post-operating state. Here, when it is determined that the state retention electrical power will be consumed, the operation determination unit 16 determines, based on the state retention electrical power information, whether the state retention electrical energy that will be consumed for retaining the post-operating state is greater than a first predetermined value. Moreover, when it is determined that the state retention electrical energy is not greater than the first predetermined value, the operation determination unit 16 determines, based on the state retention electrical power information, whether the state retention electrical energy is smaller than a second predetermined value that is smaller than the first predetermined value. The operation determination unit 16 outputs the determination result to the time-shift period setting unit 12.

The time-shift period setting unit 12 changes the time-shift period according to the determination result of the operation determination unit 16. The time-shift period setting unit 12 changes the time-shift period to be shorter than the initially set time-shift period when the operation determination unit 16 determines that the household appliance 30 will consume the state retention electrical power and determines that the state retention electrical energy is greater than the first predetermined value. Moreover, the time-shift period setting unit 12 changes the time-shift period to be longer than the initially set time-shift period when the operation determination unit 16 determines that the household appliance 30 will not consume the state retention electrical power, or when the operation determination unit 16 determines that the household appliance 30 will consume the state retention electrical power and determines that the state retention electrical energy is smaller than the second predetermined value. Moreover, the time-shift period setting unit 12 does not change the initially set time-shift period when the operation determination unit 16 determines that the household appliance 30 will consume the state retention electrical power and the state retention electrical energy is not greater than the first predetermined value but greater than the second predetermined value.

Note that, in Embodiment 2, while the time-shift period setting unit 12 changes the time-shift period to be shorter or longer only by a pre-set predetermined period, the present invention is not particularly limited thereto, and the time-shift period setting unit 12 may also change the time-shift period according to the state retention electrical energy to be consumed by the household appliance 30.

The operation of the equipment control system in Embodiment 2 is now explained.

Figure 6:
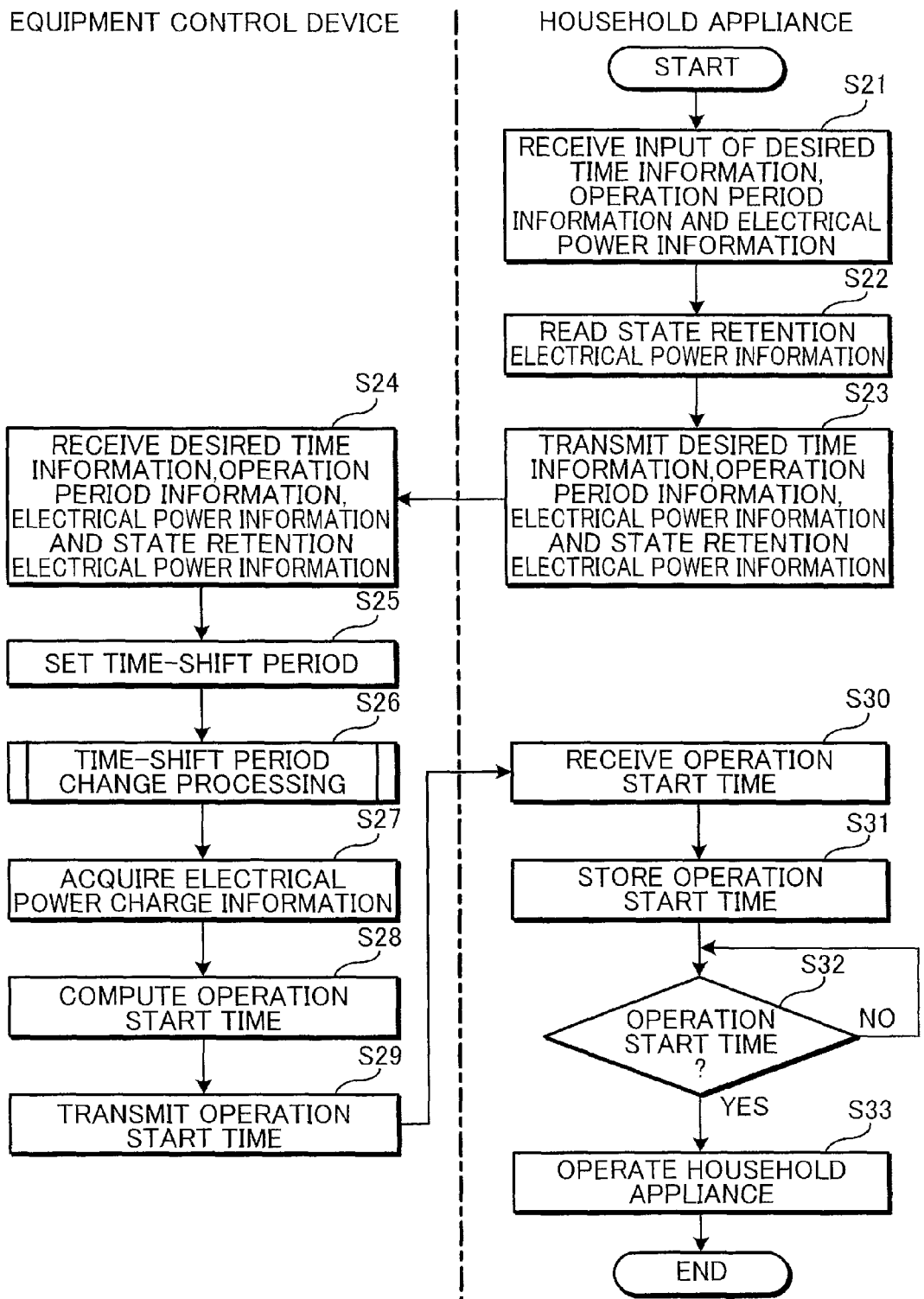
FIG. 6 is a flowchart explaining the operation of the equipment control system in Embodiment 2.

FIG. 6 is a flowchart explaining the operation of the equipment control system in Embodiment 2.

Since the processing of step S21 is the same as the processing of step S1 shown in FIG. 2, the explanation thereof is omitted. Note that, in Embodiment 2, the desired time information only includes the desired operation termination time.

Subsequently, in step S22, the transmission unit 32 reads the state retention electrical power information indicating whether the household appliance 30 will consume the state retention electrical power for retaining the post-operating state and indicating the state retention electrical energy to be consumed by the household appliance 30 for retaining the post-operating state.

Subsequently, in step S23, the transmission unit 32 transmits the desired time information, the operation period information, the electrical power information and the state retention electrical power information to the equipment control device 10b.

Subsequently, in step S24, the reception unit 11 of the equipment control device 10b receives the desired time information, the operation period information, the electrical power information and the state retention electrical power information transmitted by the transmission unit 32 of the household appliance 30. The reception unit 11 outputs the received desired time information, the operation period information and the electrical power information to the time-shift period setting unit 12, and outputs the received state retention electrical power information to the operation determination unit 16.

Subsequently, in step S25, the time-shift period setting unit 12 sets the time-shift period having a time range including the desired time information received by the reception unit 11. Note that, since the processing of step S25 is the same as the processing of step S4 shown in FIG. 2, the explanation thereof is omitted.

Figure 7:
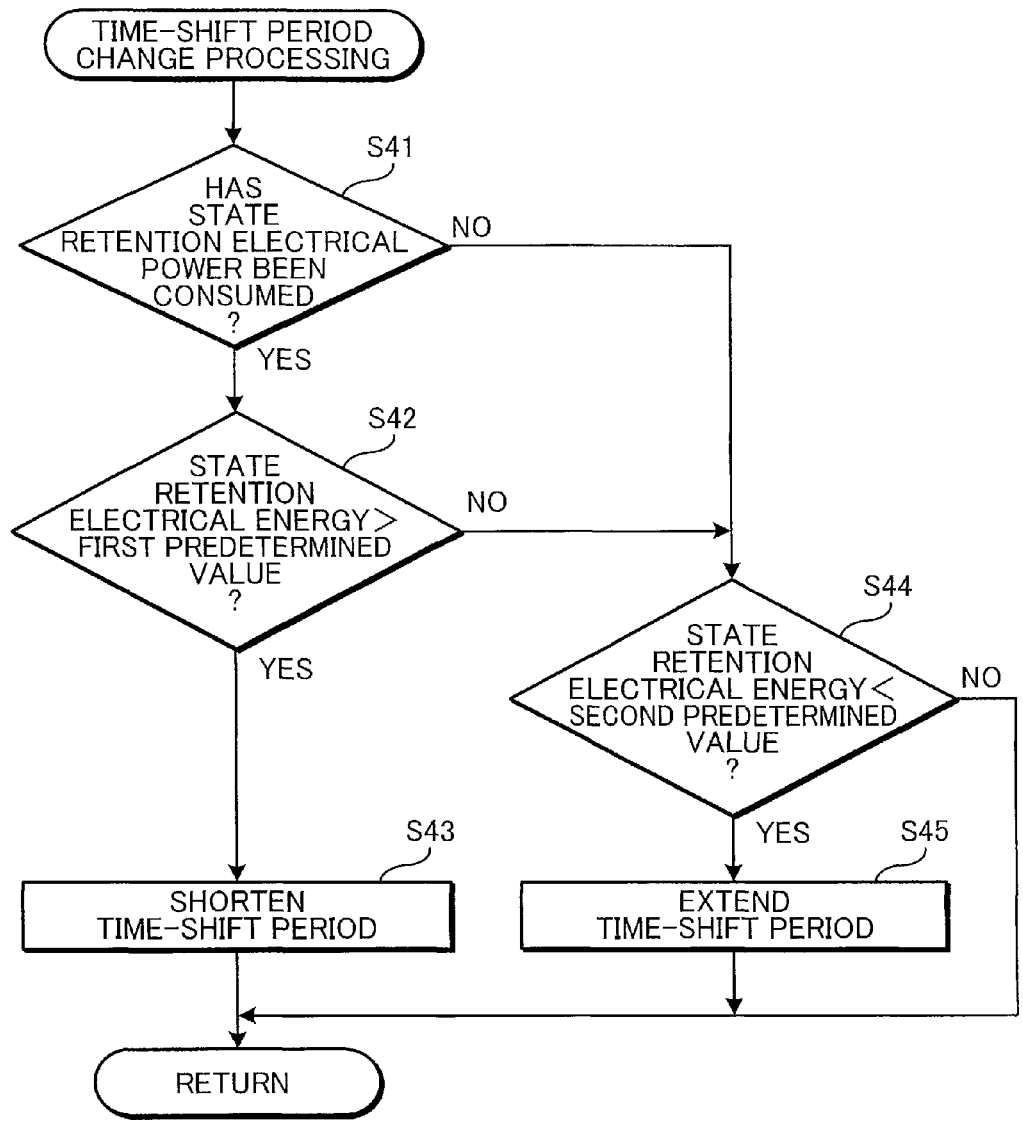
FIG. 7 is a flowchart explaining the time-shift period change processing in step S26 of FIG. 6.

Subsequently, in step S26, the operation determination unit 16 and the time-shift period setting unit 12 perform the time-shift period change processing for changing the set time-shift period. FIG. 7 is a flowchart explaining the time-shift period change processing in step S26 of FIG. 6.

In step S41, the operation determination unit 16 determines whether the household appliance 30 will consume the state retention electrical power based on the state retention electrical power information received by the reception unit 11.

Here, when it is determined that the state retention electrical power will be consumed (step S41; YES), in step S42, the operation determination unit 16 determines whether the state retention electrical energy to be consumed is greater than the first predetermined value based on the state retention electrical power information.

When it is determined that the state retention electrical energy to be consumed is greater than the first predetermined value (step S42; YES), in step S43, the time-shift period setting unit 12 shortens the initially set time-shift period by a predetermined period. Note that, as an operation where the state retention electrical energy will be greater than the first predetermined value, for instance, if the household appliance 30 is a washer-drier, this would be an operation of periodically rotating the washing tub after the drying process, and, for example, if the household appliance 30 is a water heater, this would be an operation of keeping the hot water warm after the water-boiling process. Moreover, the first predetermined value may also be set for each type of household appliance 30.

Meanwhile, when it is determined that the state retention electrical power will not be consumed (step S41; NO), or when it is determined that the state retention electrical energy to be consumed is not greater than the first predetermined value (step S42; NO), in step S44, the operation determination unit 16 determines whether the state retention electrical energy to be consumed is smaller than the second predetermined value that is smaller than the first predetermined value based on the state retention electrical power information. Here, when it is determined that the state retention electrical energy to be consumed is smaller than the second predetermined value (step S44; YES), the time-shift period setting unit 12 extends the initially set time-shift period by a predetermined period.

Meanwhile, when it is determined that the state retention electrical energy to be consumed is greater than the second predetermined value (step S44; NO), the time-shift period setting unit 12 ends the time-shift period change processing without changing the initially set time-shift period.

Returning to FIG. 6, subsequently, in step S27, the electrical power charge information acquisition unit 13 acquires the electrical power charge information showing the electrical power charge that changes hour to hour. Note that, since the processing of steps S27 to S33 is the same as the processing of steps S5 to S11 shown in FIG. 2, the explanation thereof is omitted.

Figure 8:
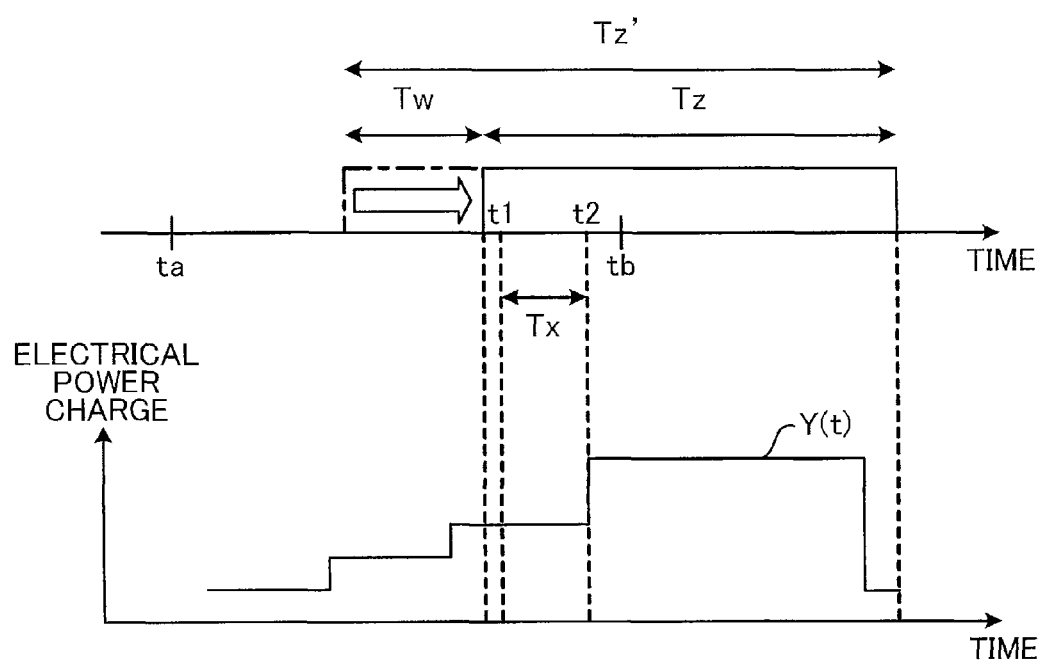
FIG. 8 is a schematic diagram explaining the time-shift period and the operation period in the case of shortening the time-shift period in Embodiment 2 of the present invention.
Figure 9:
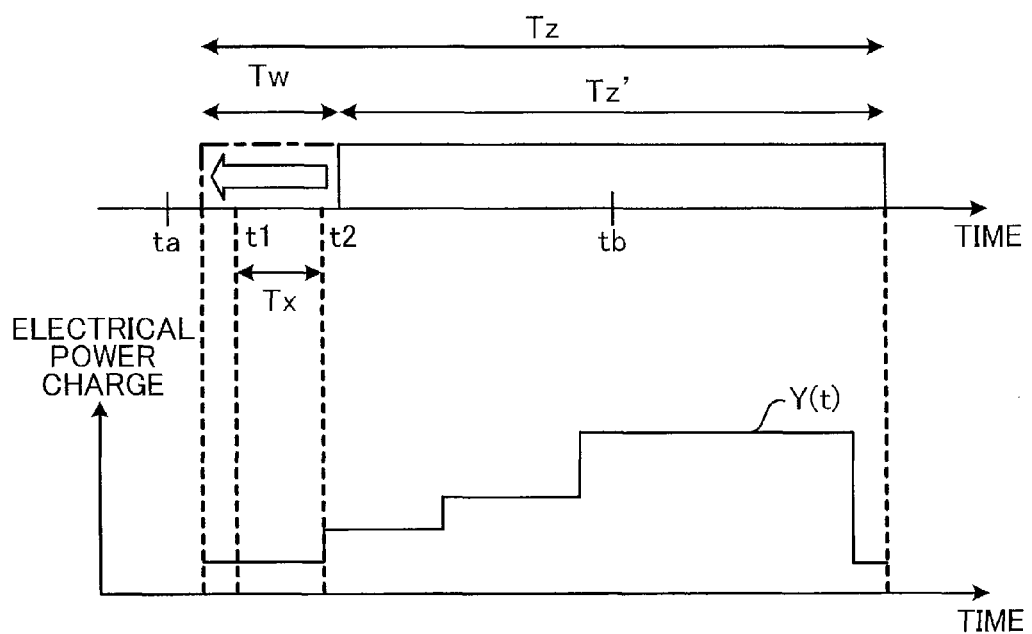
FIG. 9 is a schematic diagram explaining the time-shift period and the operation period in the case of extending the time-shift period in Embodiment 2 of the present invention.
Figure 10:
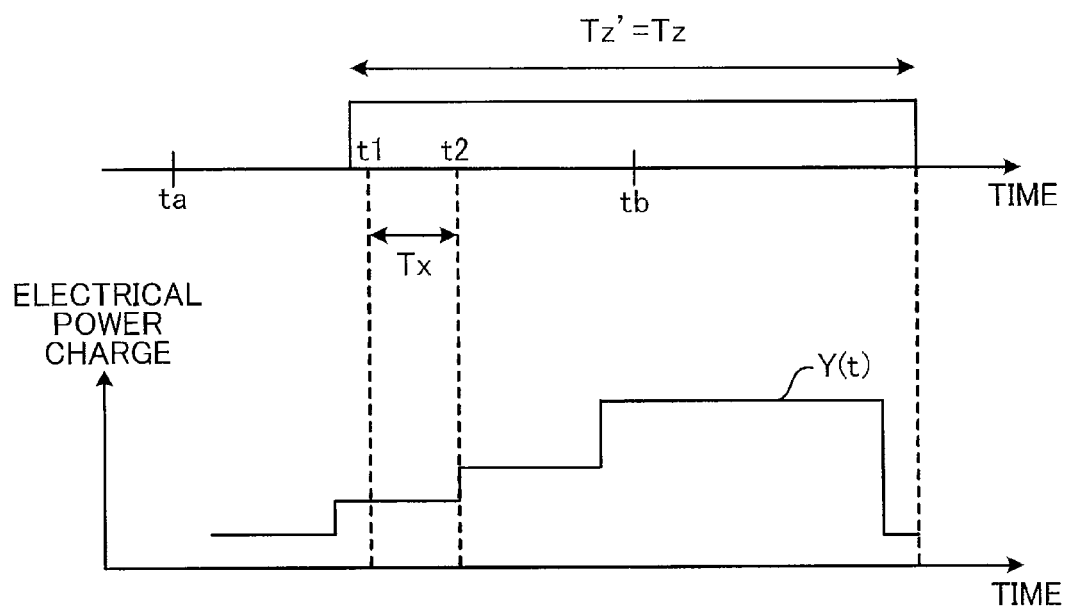
FIG. 10 is a schematic diagram explaining the time-shift period and the operation period in the case of not changing the time-shift period in Embodiment 2 of the present invention.

FIG. 8 to FIG. 10 are schematic diagrams explaining the time-shift period and the operation period in Embodiment 2 of the present invention, wherein FIG. 8 is a schematic diagram explaining the time-shift period and the operation period in the case of shortening the time-shift period in Embodiment 2 of the present invention, FIG. 9 is a schematic diagram explaining the time-shift period and the operation period in the case of extending the time-shift period in Embodiment 2 of the present invention, and FIG. 10 is a schematic diagram explaining the time-shift period and the operation period in the case of not changing the time-shift period in Embodiment 2 of the present invention.

In the top diagram of FIG. 8 to FIG. 10, the horizontal axis represents the time, and in the bottom diagram of FIG. 8 to FIG. 10, the horizontal axis represents the time and the vertical axis represents the electrical power charge Y(t) (JPY/kWh).

The time-shift period and the operation period in the case of shortening the time-shift period is foremost explained with reference to FIG. 8.

At the current time ta, when the input reception unit 31 receives the input of the desired time information indicating the desired operation termination time tb, the time-shift period setting unit 12 sets the time-shift period Tz' having a time range that is 2 hours before and after the desired operation termination time tb based thereon.

Subsequently, the operation determination unit 16 determines whether the household appliance 30 will consume the state retention electrical power for retaining the post-operating state based on the received state retention electrical power information. Here, when it is determined that the state retention electrical power will be consumed, the operation determination unit 16 determines whether the state retention electrical energy to be consumed for retaining the post-operating state is greater than the first predetermined value based on the state retention electrical power information. Note that the example of FIG. 8 shows a case where the household appliance 30 will consume the state retention electrical power and the state retention electrical energy to be consumed is greater than the first predetermined value.

Here, when it is determined that the state retention electrical energy to be consumed is greater than the first predetermined value, the time-shift period setting unit 12 shortens the initially set time-shift period Tz' by a predetermined period Tw (for example, by 1 hour). In FIG. 8, the time-shift period setting unit 12 shortens the time-shift period by shifting the head of the initially set time-shift period Tz' rearward by a predetermined period Tw.

Subsequently, the operation time computing unit 14 computes, based on the desired time information, the operation period information, the electrical power information and the electrical power charge information (electrical power charge Y(t)), the operation period Tx where the electricity charge that is billed when the household appliance 30 is operated within the changed time-shift period Tz becomes least expensive, and computes the operation start time based on the changed operation period Tx. The operation time computing unit 14 calculates the electricity charge that is billed when the household appliance 30 is operated based on the foregoing Formula (I). In other words, the operation time computing unit 14 can calculate the electricity charge that is billed by taking the integral of the value obtained by multiplying the time period-based electrical power charge Y(t) by the electrical power P(t) required to operate the household appliance 30 with respect to the operation period from the operation start time t1 to the operation termination time t2 in the time-shift period.

Note that when a plurality of operation periods Tx where the electricity charge becomes least expensive are extracted, the operation time computing unit 14 selects the operation period Tx in which the operation termination times is closest to the desired operation termination time among the plurality of operation periods Tx.

As shown in FIG. 8, as a result of the time-shift period being shortened, the computed operation termination time will become even closer to the desired operation termination time, and the state retention electrical power to be consumed by the household appliance 30 for retaining the post-operating state can be reduced.

The time-shift period and the operation period in the case of extending the time-shift period are now explained with reference to FIG. 9.

At the current time ta, when the input reception unit 31 receives the input of the desired time information indicating the desired operation termination time tb, the time-shift period setting unit 12 sets the time-shift period Tz' having a time range that is 2 hours before and after the desired operation termination time tb based thereon.

Subsequently, the operation determination unit 16 determines whether the household appliance 30 will consume the state retention electrical power for retaining the post-operating state based on the received state retention electrical power information. Here, when it is determined that the state retention electrical power will be consumed, the operation determination unit 16 determines whether the state retention electrical energy to be consumed for retaining the post-operating state is greater than the first predetermined value based on the state retention electrical power information. Here, when it is determined that the state retention electrical energy to be consumed is not greater than the first predetermined value, the operation determination unit 16 determines whether the state retention electrical energy to be consumed for retaining the post-operation state is smaller than the second predetermined value based on the state retention electrical power information. Note that the example of FIG. 9 shows a case where the household appliance 30 will consume the state retention electrical power and the state retention electrical energy to be consumed is smaller than the second predetermined value.

Here, when it is determined that the state retention electrical energy to be consumed is smaller than the second predetermined value, the time-shift period setting unit 12 extends the initially set time-shift period Tz' by a predetermined period Tw (for example, by 1 hour). In FIG. 9, the time-shift period setting unit 12 extends the time-shift period by shifting the head of the initially set time-shift period Tz' forward by a predetermined period Tw.

Subsequently, the operation time computing unit 14 computes, based on the desired time information, the operation period information, the electrical power information and the electrical power charge information (electrical power charge Y(t)), the operation period Tx where the electricity charge that is billed when the household appliance 30 is operated within the changed time-shift period Tz becomes least expensive, and computes the operation start time based on the changed operation period Tx. The operation time computing unit 14 calculates the electricity charge that is billed when the household appliance 30 is operated based on the foregoing Formula (I). In other words, the operation time computing unit 14 can calculate the electricity charge that is billed by taking the integral of the value obtained by multiplying the time period-based electrical power charge Y(t) by the electrical power P(t) required to operate the household appliance 30 with respect to the operation period from the operation start time t1 to the operation termination time t2 in the time-shift period.

Note that when a plurality of operation periods Tx where the electricity charge becomes least expensive are extracted, the operation time computing unit 14 selects the operation period Tx in which the operation termination times is closest to the desired operation termination time among the plurality of operation periods Tx.

As shown in FIG. 9, as a result of the time-shift period being extended, the household appliance 30 can be operated during a time period where the electrical power charge is less expensive in comparison to the case before the change.

The time-shift period and the operation period in the case of not changing the time-shift period are now explained with reference to FIG. 10.

At the current time ta, when the input reception unit 31 receives the input of the desired time information indicating the desired operation termination time tb, the time-shift period setting unit 12 sets the time-shift period Tz' having a time range that is 2 hours before and after the desired operation termination time tb based thereon.

Subsequently, the operation determination unit 16 determines whether the household appliance 30 will consume the state retention electrical power for retaining the post-operating state based on the received state retention electrical power information. Here, when it is determined that the state retention electrical power will be consumed, the operation determination unit 16 determines whether the state retention electrical energy to be consumed for retaining the post-operating state is greater than the first predetermined value based on the state retention electrical power information. Here, when it is determined that the state retention electrical energy to be consumed is not greater than the first predetermined value, the operation determination unit 16 determines whether the state retention electrical energy to be consumed for retaining the post-operation state is smaller than the second predetermined value based on the state retention electrical power information. Note that the example of FIG. 10 shows a case where the household appliance 30 will consume the state retention electrical power and the state retention electrical energy to be consumed is not greater than the first predetermined value but greater than the second predetermined value.

Here, when it is determined that the state retention electrical energy to be consumed is not less than the second predetermined value, the time-shift period setting unit 12 does not change the initially set time-shift period Tz'. In FIG. 10, the time-shift period setting unit 12 did not change the initially set time-shift period Tz'.

Subsequently, the operation time computing unit 14 computes, based on the desired time information, the operation period information, the electrical power information and the electrical power charge information (electrical power charge Y(t)), the operation period Tx where the electricity charge that is billed when the household appliance 30 is operated within the time-shift period Tz' becomes least expensive, and computes the operation start time based on the operation period Tx. The operation time computing unit 14 calculates the electricity charge that is billed when the household appliance 30 is operated based on the foregoing Formula (I). In other words, the operation time computing unit 14 can calculate the electricity charge that is billed by taking the integral of the value obtained by multiplying the time period-based electrical power charge Y(t) by the electrical power P(t) required to operate the household appliance 30 with respect to the operation period from the operation start time t1 to the operation termination time t2 in the time-shift period.

Note that when a plurality of operation periods Tx where the electricity charge becomes least expensive are extracted, the operation time computing unit 14 selects the operation period Tx in which the operation termination times is closest to the desired operation termination time among the plurality of operation periods Tx.

Note that, in Embodiment 2, while the time-shift period is shortened or extended by shifting the head of the initially set time-shift period Tz' rearward or forward by a predetermined period Tw, the present invention is not particularly limited thereto, and the time-shift period may also be shortened or extended by shifting the back end of the initially set time-shift period Tz' rearward or forward by a predetermined period Tw. In addition, the time-shift period may also be shortened or extended by shifting both ends of the initially set time-shift period Tz' by a predetermined period Tw.

As described above, since the operation determination unit 16 determines whether the state retention electrical energy to be consumed by the household appliance 30 for retaining the post-operating state is greater than a predetermined value and the time-shift period setting unit 12 changes the time-shift period according to the determination result of the operation determination unit 16, it is possible to reduce the power consumption required for the household appliance 30 to retain the post-operating state.

(Embodiment 3)

Figure 11:
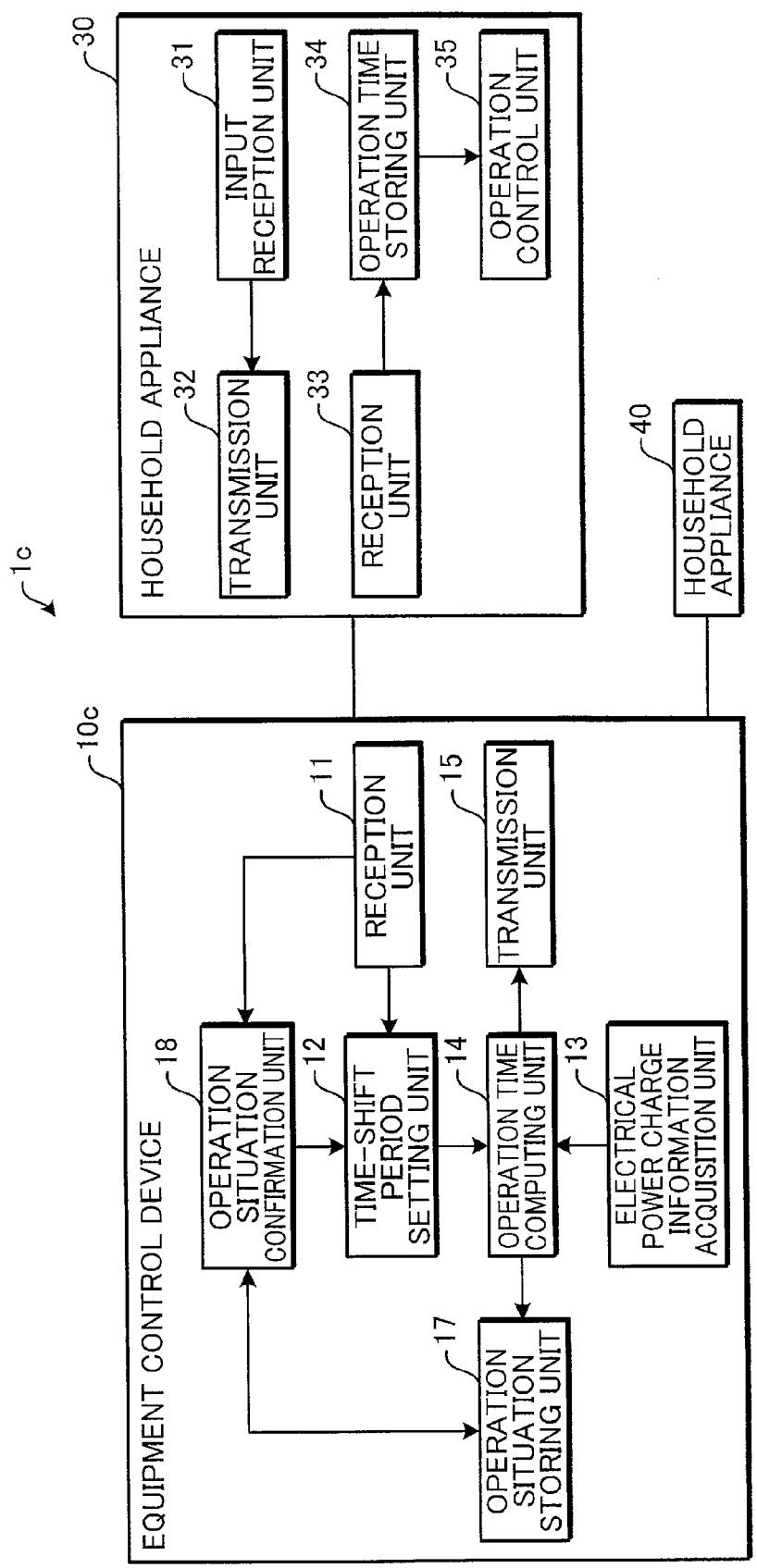
FIG. 11 is a diagram showing the configuration of the equipment control system according to Embodiment 3 of the present invention.

The equipment control system according to Embodiment 3 is now explained. FIG. 11 is a diagram showing the configuration of the equipment control system according to Embodiment 3 of the present invention. The equipment control system 1c shown in FIG. 11 comprises an equipment control device 10c, a household appliance 30 and a household appliance 40.

The household appliance 30 comprises an input reception unit 31, a transmission unit 32, a reception unit 33, an operation time storing unit 34 and an operation control unit 35. The configuration of the household appliance 40 is the same as the configuration of the household appliance 30. The equipment control device 10c comprises a reception unit 11, a time-shift period setting unit 12, an electrical power charge information acquisition unit 13, an operation time computing unit 14, a transmission unit 15, an operating situation storing unit 17 and an operating situation confirmation unit 18. Note that, in the equipment control system 1c according to Embodiment 3, explanation of the same configurations as the equipment control system 1a according to Embodiment 1 is omitted, and only the different configurations will be explained.

The transmission unit 32 of the household appliance 30 transmits identifying information for uniquely identifying the household appliance 30 to the equipment control device 10c together with the desired time information, the operation period information and the electrical power information. Note that the identifying information is, for example, the serial number of the household appliance 30 or the identification number of the household appliance 30, and is pre-stored in the memory of the household appliance 30. The transmission unit 32 reads the identifying information from the memory upon transmitting the desired time information, the operation period information and the electrical power information to the equipment control device 10c.

The reception unit 11 of the equipment control device 10c receives the desired time information, the operation period information, the electrical power information and the identifying information transmitted by the transmission unit 32 of the household appliance 30.

The operating situation storing unit 17 stores the operating situation of the respective household appliances. The operating situation storing unit 17 associates the operation start time computed by the operation time computing unit 14 and the operation period information received by the reception unit 11 with the identifying information received by the reception unit 11, and stores the result as the operating situation.

The operating situation confirmation unit 18 confirms the operating situation of the other household appliances 40. The operating situation confirmation unit 18 refers to the operating situation stored in the operating situation storing unit 17, and identifies the period that the other household appliances 40 will be operated.

The time-shift period setting unit 12 changes the time-shift period according to the operating situation of the other household appliances 40 confirmed by the operating situation confirmation unit 18. When the other household appliances 40 will be operated within the initially set time-shift period, the time-shift period setting unit 12 changes the time-shift period so that the period in which the other household appliances 40 will be operated is deleted from the initially set time-shift period.

Note that, in Embodiment 3, while the time-shift period setting unit 12 deletes the period where the other household appliances 40 is operated from the initially set time-shift period when the other household appliances 40 will be operated within the initially set time-shift period, the present invention is not limited thereto. The time-shift period setting unit 12 may also determine whether the total value of the electrical power that will be consumed when the household appliance, for which the operation start time was determined this time, is operated, and the electrical power that will be consumed when the other household appliances 40 are operated exceeds an allowable electrical power value. Subsequently, the time-shift period setting unit 12 changes the time-shift period if the total value exceeds the allowable electrical power value, and does not change the time-shift period if the total value does not exceed the allowable electrical power value.

The operation of the equipment control system in Embodiment 3 is now explained.

Figure 12:
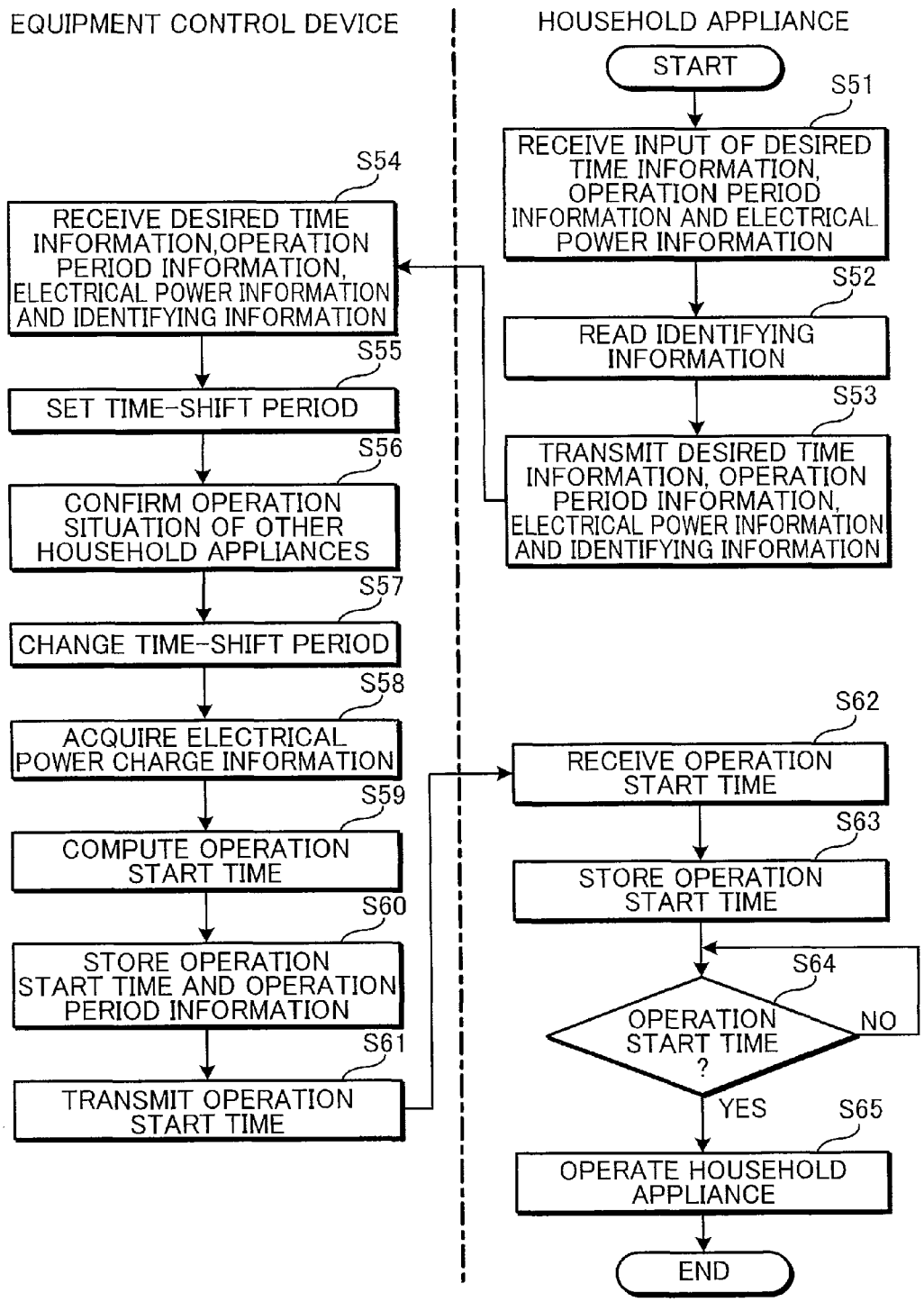
FIG. 12 is a flowchart explaining the operation of the equipment control system in Embodiment 3.

FIG. 12 is a flowchart explaining the operation of the equipment control system in Embodiment 3.

Since the processing of step S51 is the same as the processing of step S1 shown in FIG. 2, the explanation thereof is omitted.

Subsequently, in step S52, the transmission unit 32 reads the identifying information for uniquely identifying the household appliance 30.

Subsequently, in step S53, the transmission unit 32 transmits the desired time information, the operation period information, the electrical power information and the identifying information to the equipment control device 10c.

Subsequently, in step S54, the reception unit 11 of the equipment control device 10c receives the desired time information, the operation period information, the electrical power information and the identifying information transmitted by the transmission unit 32 of the household appliance 30. The reception unit 11 outputs the received desired time information, the operation period information, the electrical power information and the identifying information to the time-shift period setting unit 12.

Subsequently, in step S55, the time-shift period setting unit 12 sets a time-shift period having a time range including the desired time information received by the reception unit 11. Note that, since the processing of step S55 is the same as the processing of step S4 shown in FIG. 2, the explanation thereof is omitted.

Subsequently, in step S56, the operating situation confirmation unit 18 confirms the operating situation of the other household appliances 40 stored in the operating situation storing unit 17, and identifies the period that the other household appliances 40 will be operated. The operating situation confirmation unit 18 can identify when the other household appliances 40 will be operated based on the operation start time and the operation period of the other household appliances 40 stored in the operating situation storing unit 17.

Subsequently, in step S57, the time-shift period setting unit 12 changes the time-shift period according to the operating situation of the other household appliances 40 confirmed by the operating situation confirmation unit 18. When a period in which the other household appliances 40 will be operated is included in the initially set time-shift period, the time-shift period setting unit 12 deletes the period that the other household appliances 40 will be operated from the initially set time-shift period.

Subsequently, in step S58, the electrical power charge information acquisition unit 13 acquires the electrical power charge information showing the electrical power charge which changes hour to hour. Note that, since the processing of steps S58 and S59 is the same as the processing of steps S5 and S6 shown in FIG. 2, the explanation thereof is omitted.

Subsequently, in step S60, the operation time computing unit 14 associates the computed operation start time and the operation period information received by the reception unit 11 with the identifying information received by the reception unit 11, and stores the result as the operating situation in the operating situation storing unit 17.

Subsequently, in step S61, the transmission unit 15 transmits the operation start time computed by the operation time computing unit 14 to the household appliance 30. Note that, since the processing of steps S61 to S65 is the same as the processing of steps S7 to S11 shown in FIG. 2, the explanation thereof is omitted.

Figure 13:
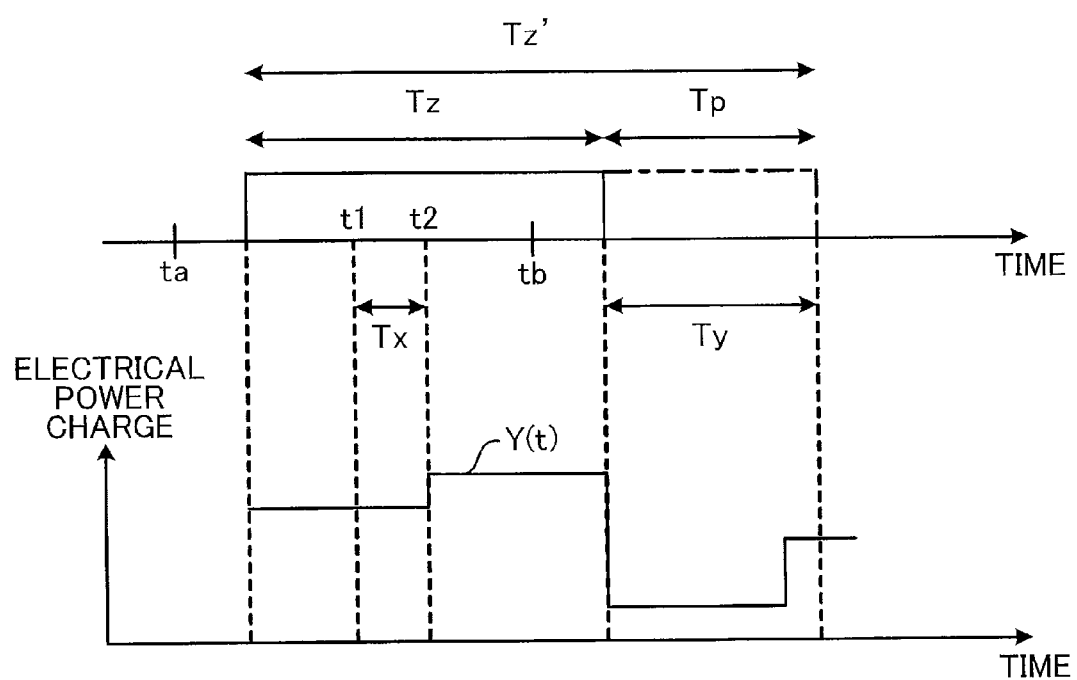
FIG. 13 is a schematic diagram explaining the time-shift period and the operation period in Embodiment 3 of the present invention.

FIG. 13 is a schematic diagram explaining the time-shift period and the operation period in Embodiment 3 of the present invention.

In the top diagram of FIG. 13, the horizontal axis represents the time, and in the bottom diagram of FIG. 13, the horizontal axis represents the time and the vertical axis represents the electrical power charge Y(t) (JPY/kWh).

At the current time ta, when the input reception unit 31 receives the input of the desired time information indicating the desired operation termination time tb, the time-shift period setting unit 12 sets the time-shift period Tz' having a time range that is 2 hours before and after the desired operation termination time tb based thereon.

Subsequently, the operating situation confirmation unit 18 confirms the operating situation of the other household appliances 40 stored in the operating situation storing unit 17, and identifies the operation period Ty in which the other household appliances 40 will be operated.

Subsequently, the time-shift period setting unit 12 determines whether the operation period Ty in which the other household appliances 40 will be operated is included within the initially set time-shift period Tz'. When the operation period Ty in which the other household appliances 40 will be operated is included within the initially set time-shift period Tz', the time-shift period setting unit 12 deletes the operation period Ty in which the other household appliances 40 will be operated from the initially set time-shift period Tz'. Consequently, as shown in FIG. 13, the period Tp that overlaps with the operation period Ty in which the other household appliances 40 will be operated within the time-shift period Tz' is shortened.

Subsequently, the operation time computing unit 14 computes, based on the desired time information, the operation period information, the electrical power information and the electrical power charge information (electrical power charge Y(t)), the operation period Tx where the electricity charge that is billed when the household appliance 30 is operated within the changed time-shift period Tz becomes least expensive, and computes the operation start time based on the changed operation period Tx. The operation time computing unit 14 calculates the electricity charge that is billed when the household appliance 30 is operated based on the foregoing Formula (1). In other words, the operation time computing unit 14 can calculate the electricity charge that is billed by taking the integral of the value obtained by multiplying the time period-based electrical power charge Y(t) by the electrical power P(t) required to operate the household appliance 30 with respect to the operation period from the operation start time t1 to the operation termination time t2 in the time-shift period.

Note that when a plurality of operation periods Tx where the electricity charge becomes least expensive are extracted, the operation time computing unit 14 selects the operation period Tx in which the operation termination times is closest to the desired operation termination time among the plurality of operation periods Tx.

As shown in FIG. 13, within the time-shift period Tz' before the change, since the electricity charge within the period Tp will be the least expensive, the operation period Tx of the household appliance 30 will be decided to be within the period Tp. Nevertheless, in the foregoing case, since this overlaps with the operation period Ty of the other household appliance 40, there is a possibility that the total power consumption value of the household will exceed the allowable electrical power value. Thus, the time-shift period setting unit 12 deletes the operation period Ty in which the other household appliance 40 will be operated from the initially set time-shift period Tz'.

As described above, since the operating situation confirmation unit 18 confirms the operating situation of the other household appliances 40, and the time-shift period setting unit 12 changes the time-shift period according to the operating situation of the other household appliances 40 confirmed by the operating situation confirmation unit 18, it is possible to prevent the electrical power from being consumed beyond the allowable value as a result of a plurality of household appliances being operated within the same time period.

Note that, in Embodiment 3, while the time-shift period setting unit 12 deletes the operation period Ty in which the other household appliances 40 will be operated from the initially set time-shift period Tz', the present invention is not particularly limited thereto. The time-shift period setting unit 12 may also shift the time-shift period Tz' so that the operation period Ty in which the other household appliances 40 will be operated is not included without shortening the time range of the initially set time-shift period Tz'.

(Embodiment 4)

The equipment control system according to Embodiment 4 is now explained. FIG. 14 is a diagram showing the configuration of the equipment control system according to Embodiment 4 of the present invention. The equipment control system 1d shown in FIG. 14 comprises an equipment control device 10d and a household appliance 30.

The household appliance 30 comprises an input reception unit 31, a transmission unit 32, a reception unit 33, an operation time storing unit 34 and an operation control unit 35. The equipment control device 10d comprises a reception unit 11, a time-shift period setting unit 12, an electrical power charge information acquisition unit 13, an operation time computing unit 14, a transmission unit 15 and an individual information acquisition unit 19. Note that, in the equipment control system 1d according to Embodiment 4, explanation of the same configurations as the equipment control system 1a according to Embodiment 1 is omitted, and only the different configurations will be explained.

The transmission unit 32 of the household appliance 30 transmits the type information for identifying the type of the household appliance 30 to the equipment control device 10d together with the desired time information, the operation period information and the electrical power information. Note that the type information is pre-stored in the memory of the household appliance 30. The transmission unit 32 reads the type information from the memory upon transmitting the desired time information, the operation period information and the electrical power information to the equipment control device 10d. Note that the type information is one type of individual information related to the household appliance 30. Note that, as the individual information, for example, information indicating the time-shift period of the household appliance 30 may also be used.

The reception unit 11 of the equipment control device 10d receives the desired time information, the operation period information, the electrical power information and the type information transmitted by the transmission unit 32 of the household appliance 30. The individual information acquisition unit 19 acquires the type information received by the reception unit 11.

The time-shift period setting unit 12 sets the time-shift period according to the type information acquired by the individual information acquisition unit 19. The time-shift period setting unit 12 pre-stores the table data which associates the type of household appliance and the time-shift period. The table data stores how many hours before and after the desired operation termination time shall be set as the time-shift period. The time-shift period setting unit 12 refers to the table data, and extracts the time-shift period corresponding to the type information acquired by the individual information acquisition unit 19.

The operation time computing unit 14 pre-stores, for each type of household appliance, the weighting function which associates the degree of termination demand (weighting value) indicating to what degree the operation of the household appliance should be ended close to the desired operation termination time, and the time from the operation termination time, which corresponds to the computed operation start time, to the desired operation termination time. Specifically, the weighting function takes the time as a horizontal axis and the degree of termination demand (weighting value) indicating to what degree the operation of the household appliance should be ended close to the desired operation termination time as the vertical axis. As the value of the degree of termination demand of the vertical axis increases, this shows that the operation of the household appliance needs to be ended closer to the desired operation termination time. Accordingly, for example, in a case of a function where the weighting function decreases exponentially, the weighting value of the degree of termination demand will increase when the time from the operation termination time, which corresponds to the computed operation start time, to the desired operation termination time is short, and the weighting value of the degree of termination demand will decrease when the time from the operation termination time, which corresponds to the computed operation start time, to the desired operation termination time is long.

Figure 15A:
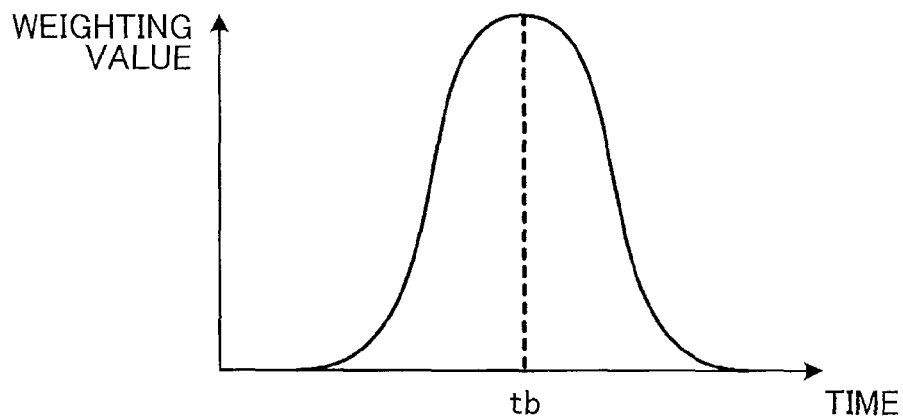
FIG. 15A is a diagram showing an example of the first weighting function in which the weighting value exponentially increases up to the desired operation termination time and the weighting value exponentially decreases after the desired operation termination time.
Figure 15B:
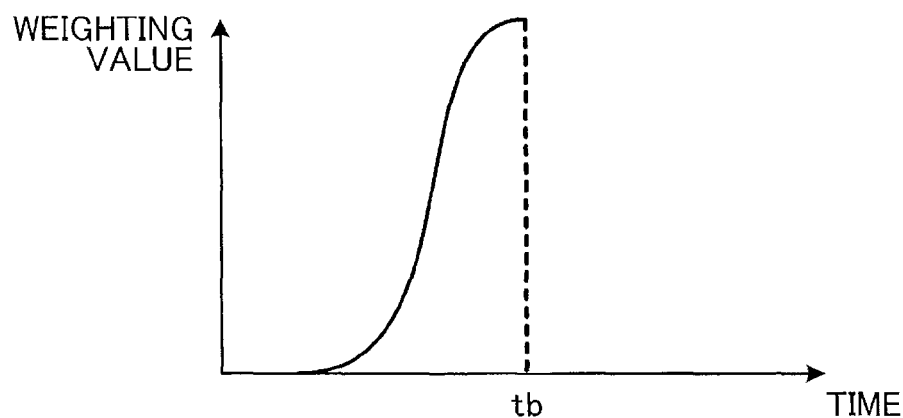
FIG. 15B is a diagram showing an example of the second weighting function in which the weighting value exponentially increases up to the desired operation termination time.
Figure 15C:
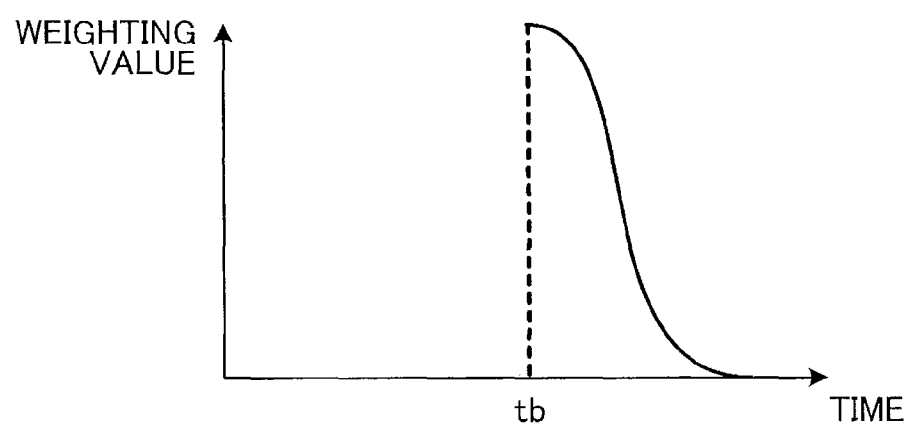
FIG. 15C is a diagram showing an example of the third weighting function in which the weighting value exponentially decreases after the desired operation termination time.

FIG. 15A to FIG. 15C are drawings showing examples of a weighing function. FIG. 15A is a diagram showing an example of the first weighting function in which the weighting value exponentially increases up to the desired operation termination time and the weighting value exponentially decreases after the desired operation termination time, FIG. 15B is a diagram showing an example of the second weighting function in which the weighting value exponentially increases up to the desired operation termination time, and FIG. 15C is a diagram showing an example of the third weighting function in which the weighting value exponentially decreases after the desired operation termination time.

As shown in FIG. 15A to FIG. 15C, the operation time computing unit 14 associates a plurality of weighting functions with the type of the household appliance 30, and stores the association. For example, the first weighting function shown in FIG. 15A is associated with a washer-drier, the second weighting function shown in FIG. 15B is associated with a hot water dispenser and a rice cooker, and the third weighting function shown in FIG. 15C is associated with a coffee machine.

When a plurality of operation start times having the same electricity charge to be billed is computed, the operation time computing unit 14 calculates the weighting value based on the weighting function. Here, the operation time computing unit 14 calculates the weighting value corresponding to the respective operation termination times of the plurality of computed operation start times based on the weighting function. The operation time computing unit 14 multiplies the calculated weighting value by the respective electricity charges, and selects the operation start time in which the multiplied value is the greatest as the optimal operation start time.

The operation of the equipment control system in Embodiment 4 is now explained.

Figure 16:
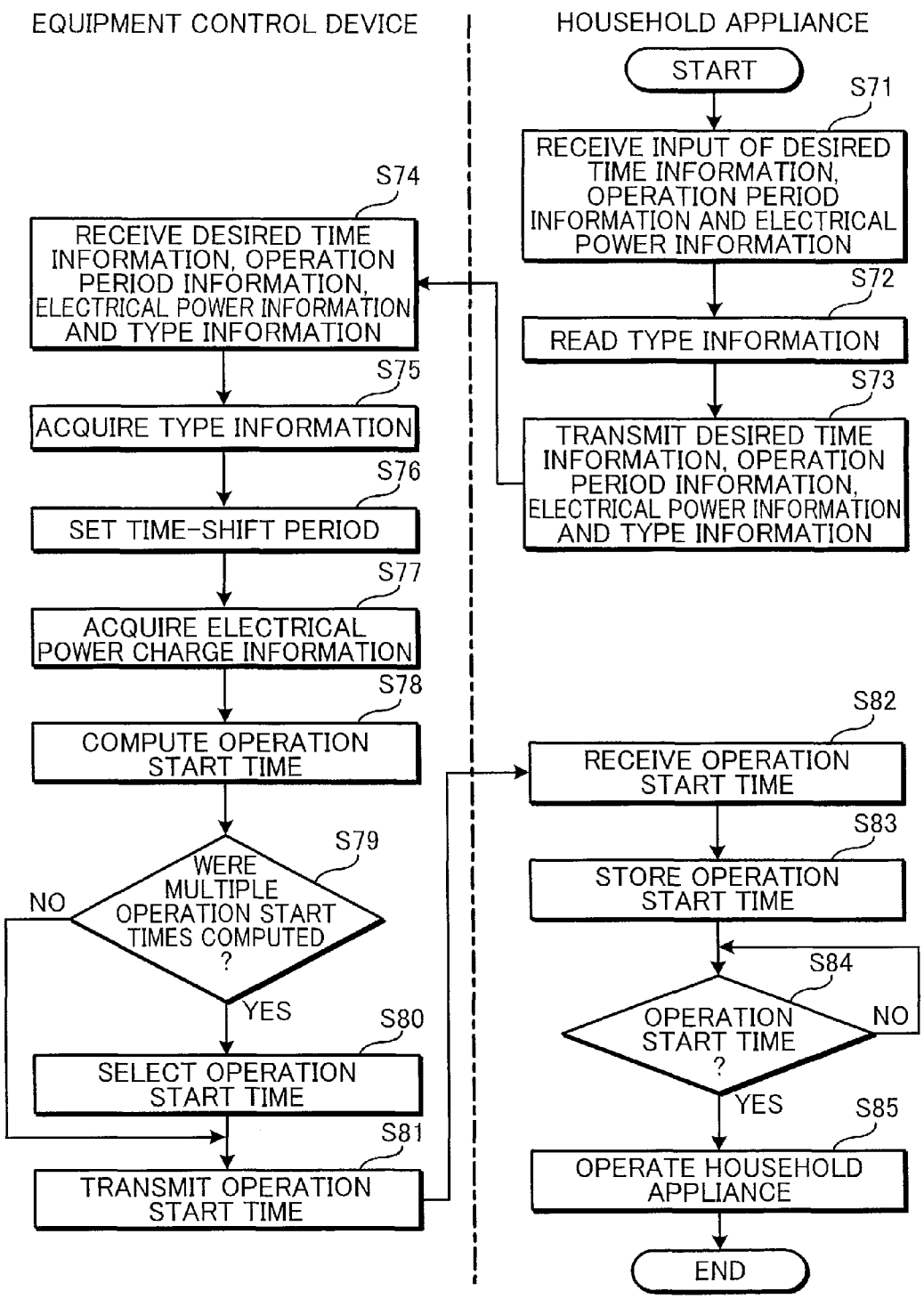
FIG. 16 is a flowchart explaining the operation of the equipment control system in Embodiment 4.

FIG. 16 is a flowchart explaining the operation of the equipment control system in Embodiment 4.

Since the processing of step S71 is the same as the processing of step S1 shown in FIG. 2, the explanation thereof is omitted.

Subsequently, in step S72, the transmission unit 32 reads the type information for identifying the type of the household appliance 30.

Subsequently, in step S73, the transmission unit 32 transmits the desired time information, the operation period information, the electrical power information and the type information to the equipment control device 10d.

Subsequently, in step S74, the reception unit 11 of the equipment control device 10d receives the desired time information, the operation period information, the electrical power information and the type information transmitted by the transmission unit 32 of the household appliance 30. The reception unit 11 outputs the received desired time information, the operation period information and the electrical power information to the time-shift period setting unit 12, and outputs the received type information to the individual information acquisition unit 19.

Subsequently, in step S75, the individual information acquisition unit 19 acquires the type information received by the reception unit 11.

Subsequently, in step S76, the time-shift period setting unit 12 refers to the table data which associates the type of household appliance and the time-shift period, and extracts the time-shift period corresponding to the type information acquired by the individual information acquisition unit 19.

FIG. 17 is a diagram showing an example of the table data. In FIG. 17, in the table data, the type of the household appliance 30, the time-shift period, the time-shift pattern and the weighting function are associated. The time-shift pattern includes a first time-shift pattern having a predetermined time range before and after the desired operation termination time, a second time-shift pattern including the desired operation termination time and having a predetermined time range before the desired operation termination time, and a third time-shift pattern including the desired operation termination time and having a predetermined time ranger after the desired operation termination time. Note that the first to third time-shift patterns respectively correspond to the time-shift periods shown in FIG. 3A to FIG. 3C.

Moreover, the weighting function includes the first weighting function, the second weighting function, and the third weighting function shown in FIG. 15A to FIG. 15C.

As shown in FIG. 17, with the washer-drier, the time-shift period of "±1 hour", the first time-shift pattern, and the first weighting function are associated, with the hot water dispenser, the time-shift period of "−1 hour", the second time-shift pattern, and the second weighting function are associated, with the rice cooker, the time-shift period of "−1 hour", the second time-shift pattern, and the second weighting function are associated, and with the coffee machine, the time-shift period of "+0.5 hours", the third time-shift pattern, and the third weighting function are associated.

Since the processing of steps S77 and S78 is the same as the processing of steps S5 and S6 shown in FIG. 2, the explanation thereof is omitted.

Subsequently, in step S79, the operation time computing unit 14 determines whether a plurality of operation start times having the same electricity charge to be billed have been computed. Here, when it is determined that a plurality of operation start times having the same electricity charge to be billed have not been computed; that is, when it is determined that only one operation start time was computed, the routine proceeds to the processing of step S81.

Meanwhile, when it is determined that a plurality of operation start times having the same electricity charge to be billed have been computed, in step S80, the operation time computing unit 14 selects the optimal operation start time among the plurality of operation start time. Specifically, the operation time computing unit 14 calculates the weighting value corresponding to the respective operation termination times of the plurality of computed operation start times based on the weighting function which associates the degree of termination demand (weighting value) indicating to what degree the operation of the household appliance should be ended close to the desired operation termination time, and the time from the operation termination time, which corresponds to the computed operation start time, to the desired operation termination time. The operation time computing unit 14 multiplies the calculated weighting value by the respective electricity charges, and selects the operation start time in which the multiplied value is the greatest as the optimal operation start time.

Note that, in this embodiment, in step S80, while the optimal operation start time is selected among the plurality of operation start times by multiplying the weighting value by the respective electricity charges of the plurality of operation start times, the present is not particularly limited thereto, and, in step S78, the operation start time may be computed upon giving consideration to the weighting value. In the foregoing case, the processing of step S79 and step S80 may be omitted.

Subsequently, in step S81, the transmission unit 15 transmits, to the household appliance 30, the operation start time computed by the operation time computing unit 14. Note that, since the processing of steps S81 to S85 is the same as the processing of step S7 to S11 shown in FIG. 2, the explanation thereof is omitted.

Figure 18A:
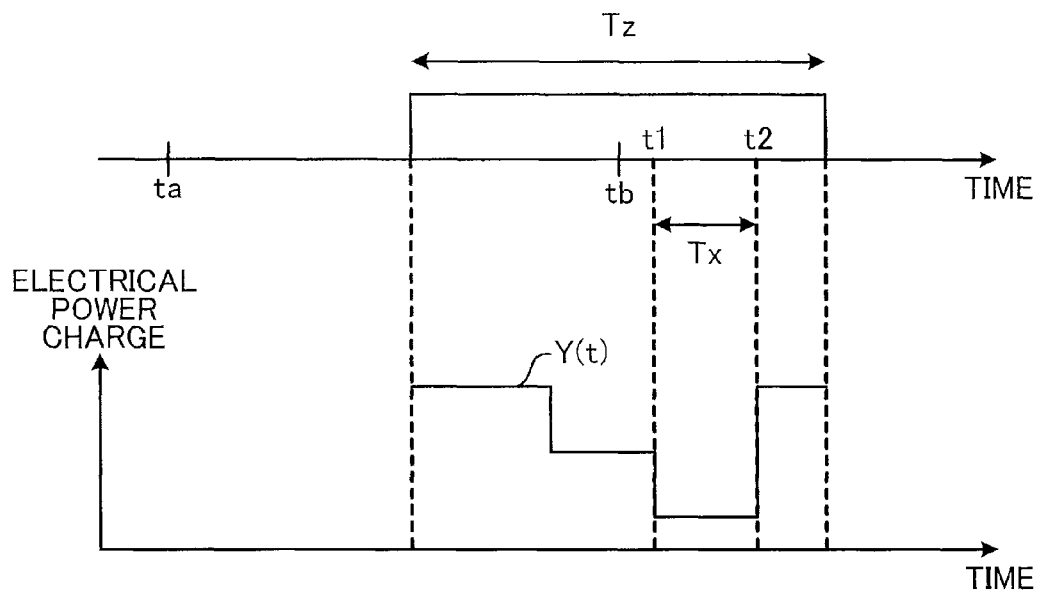
FIGS. 18A and 18B are schematic diagrams explaining the time-shift period and the operation period in Embodiment 4 of the present invention.
Figure 18B:
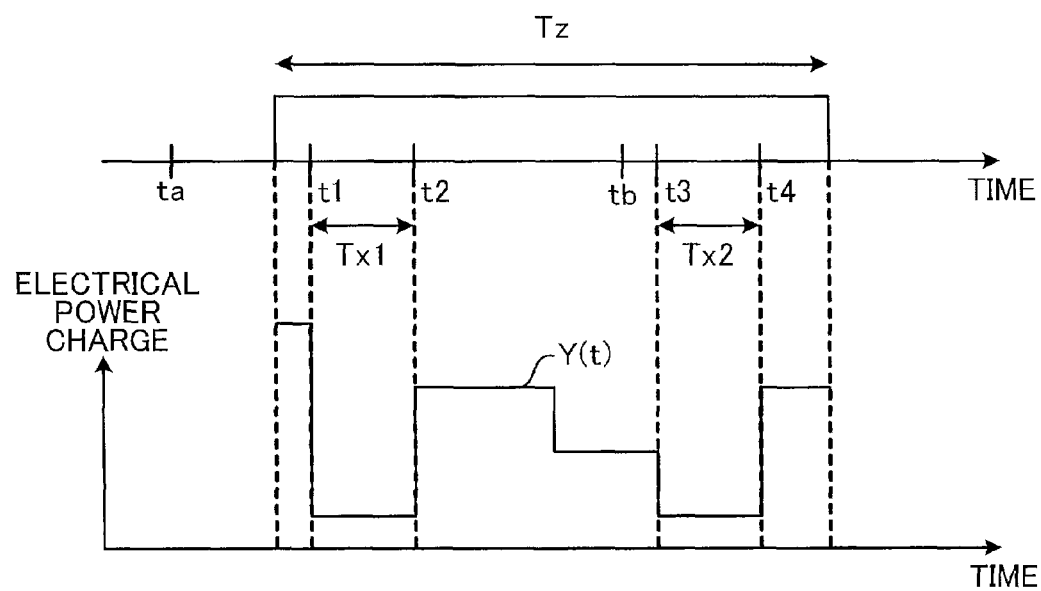

FIG. 18A and FIG. 18B are schematic diagrams explaining the time-shift period and the operation period in Embodiment 4 of the present invention. FIG. 18A and FIG. 18B respectively represent the time-shift period and the operation period of different household appliances.

In the top diagram of FIG. 18A and FIG. 18B, the horizontal axis represents the time, and in the bottom diagram of FIG.

18A and FIG. 18B, the horizontal axis represents the time and the vertical axis represents the electrical power charge Y(t) (JPY/kWh).

At the current time ta, when the input reception unit 31 receives the input of the desired time information indicating the desired operation termination time tb, the time-shift period setting unit 12 refers to the table data which associates the type of household appliance and the time-shift period, and extracts the time-shift period Tz corresponding to the type information acquired by the individual information acquisition unit 19. The time-shift period Tz differs for each type of household appliance. Thus, the time-shift period Tz shown in FIG. 18A and the time-shift period Tz shown in FIG. 18B have different time ranges.

Subsequently, the operation time computing unit 14 computes, based on the desired time information, the operation period information, the electrical power information and the electrical power charge information (electrical power charge Y(t)), the operation period Tx where the electricity charge that is billed when the household appliance 30 is operated within the time-shift period Tz becomes least expensive, and computes the operation start time based on the operation period Tx. The operation time computing unit 14 calculates the electricity charge that is billed when the household appliance 30 is operated based on the foregoing Formula (I). In other words, the operation time computing unit 14 can calculate the electricity charge that is billed by taking the integral of the value obtained by multiplying the time period-based electrical power charge Y(t) by the electrical power P(t) required to operate the household appliance 30 with respect to the operation period from the operation start time t1 to the operation termination time t2 in the time-shift period.

Here, as shown in FIG. 18B, when a plurality of operation periods Tx1, Tx2 in which the electricity charge to be billed will be the least expensive are extracted, the operation time computing unit 14 selects the optimal operation period among the plurality of operation periods Tx1, Tx2.

The operation time computing unit 14 selects the optimal operation start time among a plurality of operation start times t1, t3. Specifically, the operation time computing unit 14 calculates the weighting value corresponding to the respective operation termination times t2, t4 of the plurality of computed operation start times t1, t3 based on the weighting function which associates the degree of termination demand (weighting value) indicating to what degree the operation of the household appliance should be ended close to the desired operation termination time, and the time from the operation termination time, which corresponds to the computed operation start time, to the desired operation termination time. The operation time computing unit 14 multiplies the calculated weighting value by the respective electricity charges of the plurality of operation start times t1, t3, and selects the operation start time in which the multiplied value is the greatest as the optimal operation start time.

For example, in the case of a household appliance in which the operation termination time is preferably closer to the desired operation termination time, the operation start time t3 shown in FIG. 18B is selected.

Accordingly, since the individual information acquisition unit 19 acquires the individual information (type information) which is unique to the household appliance 30, and the time-shift period setting unit 12 sets a time-shift period according to the individual information acquired by the individual information acquisition unit 19, it is possible to set an appropriate time-shift period according to the respective household appliances, and thereby improve the user's convenience.

(Embodiment 5)

Figure 19:
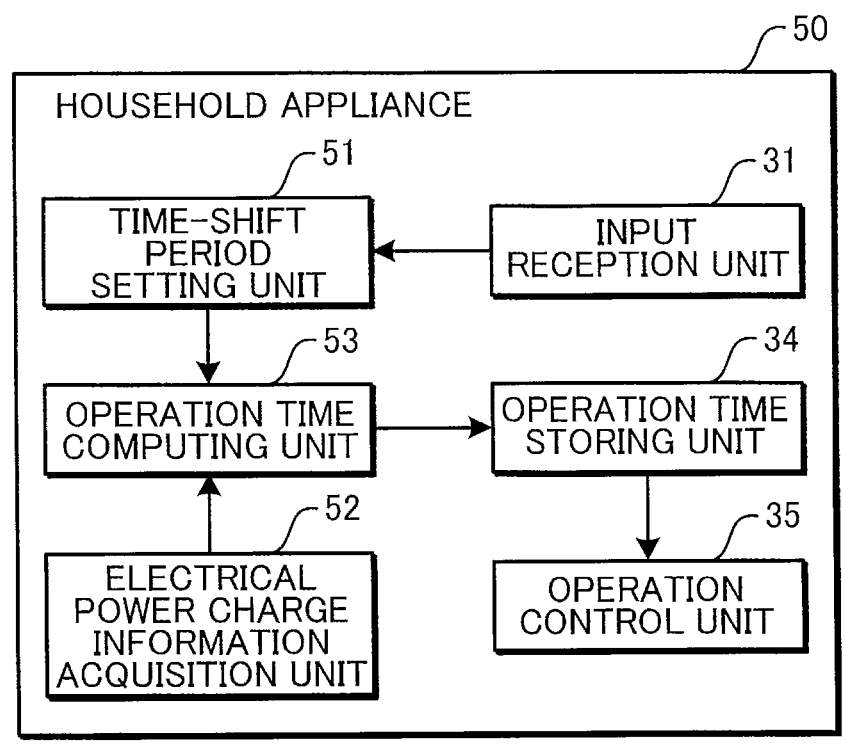
FIG. 19 is a diagram showing the configuration of the household appliance according to Embodiment 5 of the present invention.

The household appliance according to Embodiment 5 is now explained. FIG. 19 is a diagram showing the configuration of the household appliance according to Embodiment 5 of the present invention. The household appliance 50 shown in FIG. 19 comprises an input reception unit 31, an operation time storing unit 34, an operation control unit 35, a time-shift period setting unit 51, an electrical power charge information acquisition unit 52 and an operation time computing unit 53.

The input reception unit 31 receives the user's input of the desired time information indicating the desired operation termination of the household appliance 50 desired by the user, the operation period information indicating the period required for operating the household appliance 50, and the electrical power information indicating the electrical power required for operating the household appliance 50. The input reception unit 31 outputs the received desired time information, the operation period information and the electrical power information to the time-shift period setting unit 51.

The time-shift period setting unit 51 sets a time-shift period indicating a period which has a time range including the desired time information received by the input reception unit 31 and during which the operation start time or the operation termination time of the household appliance 50 is shiftable. Note that, since the configuration of the time-shift period setting unit 51 is the same as the configuration of the time-shift period setting unit 12 shown in FIG. 1, the detailed explanation thereof is omitted.

The electrical power charge information acquisition unit 52 acquires the electrical power charge information showing the electrical power charge that changes hour to hour. Note that, since the configuration of the electrical power charge information acquisition unit 52 is the same as the configuration of the electrical power charge information acquisition unit 13 shown in FIG. 1, the detailed explanation thereof is omitted.

The operation time computing unit 53 computes, based on the desired time information, the operation period information and the electrical power information received by the input reception unit 31 and the electrical power charge information acquired by the electrical power charge information acquisition unit 52, the operation start time where the electricity charge that is billed when the household appliance 50 is operated within the time-shift period set by the time-shift period setting unit 51 will fall below a predetermined charge. Note that, since the configuration of the operation time computing unit 53 is the same as the configuration of the operation time computing unit 14 shown in FIG. 1, the detailed explanation thereof is omitted.

The operation time computing unit 53 outputs the computed operation start time to the operation time storing unit 34. The operation time storing unit 34 stores the operation start time computed by the operation time computing unit 53. The operation control unit 35 controls the operation of the household appliance 50 based on the operation start time stored in the operation time storing unit 34.

With the operation of the household appliance 50 in Embodiment 5, the processing (processing of steps S2, S3, S7, S8) of transmitting and receiving information between the equipment control device and the household appliance is no longer required in the operation of the equipment control system shown in FIG. 2, and the processing of steps S1, S4 to S6, S9 to S11 is entirely performed by the household appliance 50.

In Embodiments 1 to 5, while a household appliance in a home was explained as an example of the electrical equipment, the present invention is not limited thereto, and similar results can be obtained with the electrical equipment handled in offices, factories and facilities.

Note that the specific embodiments described above mainly include the invention configured as described below.

The electrical equipment control device according to one aspect of the present invention comprises a reception unit for receiving desired time information indicating a desired operation start time or a desired operation termination time of an electrical equipment desired by a user, operation period information indicating a period required for operation by the electrical equipment, and electrical power information indicating an electrical power required for operation by the electrical equipment, a time-shift period setting unit for setting a time-shift period indicating a period which has a time range including the desired time information received by the reception unit and during which the operation start time or the operation termination time of the electrical equipment is shiftable, an electrical power charge information acquisition unit for acquiring electrical power charge information indicating an electrical power charge that changes hour to hour, an operation time computing unit for computing, based on the desired time information, the operation period information and the electrical power information received by the reception unit and the electrical power charge information acquired by the electrical power charge information acquisition unit, the operation start time or the operation termination time, on the basis of which the electricity charge that is billed when the electrical equipment is operated within the time-shift period set by the time-shift period setting unit falls to or below a predetermined charge, and a transmission unit for transmitting, to the electrical equipment, the operation start time or the operation termination time computed by the operation time computing unit.

According to the foregoing configuration, the reception unit receives desired time information indicating a desired operation start time or a desired operation termination time of an electrical equipment desired by a user, operation period information indicating a period required for operating the electrical equipment, and electrical power information indicating an electrical power required for operating the electrical equipment. The time-shift period setting unit sets a time-shift period indicating a period which has a time range including the desired time information received by the reception unit and during which the operation start time or the operation termination time of the electrical equipment is shiftable. The electrical power charge information acquisition unit acquires electrical power charge information indicating an electrical power charge that changes hour to hour. In addition, the operation time computing unit computes, based on the desired time information, the operation period information and the electrical power information received by the reception unit and the electrical power charge information acquired by the electrical power charge information acquisition unit, the operation start time or the operation termination time where the electricity charge that is billed when the electrical equipment is operated within the time-shift period set by the time-shift period setting unit will fall below a predetermined charge. The transmission unit transmits, to the electrical equipment, the operation start time or the operation termination time computed by the operation time computing unit.

Accordingly, since the time-shift period has a time range including the desired time information indicating the desired operation start time or the desired operation termination time, the time-shift period is set to shift the operation start time or the operation termination time of the electrical equipment within the scope of its time range, and the operation start time or the operation termination time where the electricity charge that is billed when the electrical equipment is operated within the time-shift period set by the time-shift period setting unit will fall below a predetermined charge is computed. Consequently, a time-shift period exceeding the user's allowable range will no longer be set, and the user can enjoy the advantages of convenience and economic efficiency.

Moreover, preferably, the foregoing electrical equipment control device further comprises an operation determination unit for determining whether a state retention electrical energy that is consumed by the electrical equipment for retaining a post-operating state is greater than a predetermined value, and the time-shift period setting unit changes the time-shift period according to a determination result of the operation determination unit.

According to the foregoing configuration, since the operation determination unit determines whether a state retention electrical energy that is consumed by the electrical equipment for retaining a post-operating state is greater than a predetermined value, and the time-shift period setting unit changes the time-shift period according to a determination result of the operation determination unit, the power consumption of the electrical equipment for retaining the post-operating state can be reduced.

Moreover, in the foregoing electrical equipment control device, preferably, the time-shift period setting unit shortens the set time-shift period when the operation determination unit determines that the state retention electrical energy that is consumed by the electrical equipment for retaining post-operating state is greater than a predetermined value.

According to the foregoing configuration, since the set time-shift period is shortened when the operation determination unit determines that the state retention electrical energy that is consumed by the electrical equipment for retaining post-operating state is greater than a predetermined value, with an electrical equipment having a great state retention electrical power, it is possible to shorten the time range of the time-shift period and reduce the time difference between the desired operation termination time and the actual operation termination time, and thereby reduce the electrical energy required for the state retention.

Moreover, preferably, the foregoing electrical equipment control device further comprises a confirmation unit for confirming an operating situation of another electrical equipment, and the time-shift period setting unit changes the time-shift period according to the operating situation of the other electrical equipment confirmed by the confirmation unit.

According to the foregoing configuration, since the confirmation unit confirms an operating situation of another electrical equipment, and the time-shift period setting unit changes the time-shift period according to the operating situation of the other electrical equipment confirmed by the confirmation unit, it is possible to prevent the consumption of electrical power beyond the allowable value caused by a plurality of electrical equipment being operated during the same time period.

Moreover, in the foregoing electrical equipment control device, preferably, the confirmation unit confirms an operation start time and an operation period of another electrical equipment, and the time-shift period setting unit changes the set time-shift period so that a period identified by the operation start time and the operation period of the other electrical equipment confirmed by the confirmation unit is not included.

According to the foregoing configuration, since an operation start time and an operation period of another electrical equipment are confirmed and the set time-shift period is changed so that a period identified by the operation start time and the operation period of the other electrical equipment confirmed by the confirmation unit is not included, it is possible to prevent the consumption of electrical power beyond the allowable value caused by a plurality of electrical equipment being operated during the same time period.

Moreover, preferably, the foregoing electrical equipment control device further comprises an individual information acquisition unit for acquiring individual information that is unique to the electrical equipment, and the time-shift period setting unit sets the time-shift period according to the individual information acquired by the individual information acquisition unit.

According to the foregoing configuration, since the individual information acquisition unit acquires individual information that is unique to the electrical equipment, and the time-shift period setting unit sets the time-shift period according to the individual information acquired by the individual information acquisition unit, it is possible to set an appropriate time-shift period according to each electrical equipment, and thereby further improve the user's convenience.

The electrical equipment control method according to another aspect of the present invention comprises a reception step of receiving desired time information indicating a desired operation start time or a desired operation termination time of an electrical equipment desired by a user, operation period information indicating a period required for operation by the electrical equipment, and electrical power information indicating an electrical power required for operation by the electrical equipment, a time-shift period setting step of setting a time-shift period indicating a period which has a time range including the desired time information received in the reception step and during which the operation start time or the operation termination time of the electrical equipment is shiftable, an electrical power charge information acquisition step of acquiring electrical power charge information indicating an electrical power charge that changes hour to hour, an operation time computing step of computing, based on the desired time information, the operation period information and the electrical power information received in the reception step and the electrical power charge information acquired in the electrical power charge information acquisition step, the operation start time or the operation termination time, on the basis of which the electricity charge that is billed when the electrical equipment is operated within the time-shift period set in the time-shift period setting step falls to or below a predetermined charge, and a transmission step of transmitting, to the electrical equipment, the operation start time or the operation termination time computed in the operation time computing step.

According to the foregoing configuration, in the reception step, received are desired time information indicating a desired operation start time or a desired operation termination time of an electrical equipment desired by a user, operation period information indicating a period required for operation by the electrical equipment, and electrical power information indicating an electrical power required for operation by the electrical equipment. In the time-shift period setting step, set is a time-shift period indicating a period which has a time range including the desired time information received in the reception step and during which the operation start time or the operation termination time of the electrical equipment is shiftable. In the electrical power charge information acquisition step, acquired is electrical power charge information indicating an electrical power charge that changes hour to hour. In addition, in the operation time computing step, based on the desired time information, the operation period information and the electrical power information received in the reception step and the electrical power charge information acquired in the electrical power charge information acquisition step, computed is the operation start time or the operation termination time where the electricity charge that is billed when the electrical equipment is operated within the time-shift period set in the time-shift period setting step will fall below a predetermined charge. In the transmission step, transmitted to the electrical equipment is the operation start time or the operation termination time computed in the operation time computing step.

Accordingly, since the time-shift period has a time range including the desired time information indicating the desired operation start time or the desired operation termination time, the time-shift period is set to shift the operation start time or the operation termination time of the electrical equipment within the scope of its time range, and the operation start time or the operation termination time where the electricity charge that is billed when the electrical equipment is operated within the time-shift period set by the time-shift period setting unit will fall below a predetermined charge is computed. Consequently, a time-shift period exceeding the user's allowable range will no longer be set, and the user can enjoy the advantages of convenience and economic efficiency.

The electrical equipment according to yet another aspect of the present invention comprises an input reception unit for receiving an input of desired time information indicating a desired operation start time or a desired operation termination time of an electrical equipment desired by a user, a transmission unit for transmitting the desired time information received by the input reception unit, operation period information indicating a period required for operating the electrical equipment, and electrical power information indicating an electrical power required for operating the electrical equipment, a reception unit for receiving the operation start time or the operation termination time transmitted from an electrical equipment control device which receives the desired time information, the operation period information and the electrical power information transmitted from the transmission unit, sets a time-shift period indicating a period which has a time range including the desired time information and during which the operation start time or the operation termination time of the electrical equipment is shiftable, and computes, based on the desired time information, the operation period information and the electrical power information and electrical power charge information indicating an electrical power charge that changes hour to hour, the operation start time or the operation termination time, on the basis of which the electricity charge that is billed when the electrical equipment is operated within the time-shift period set by the time-shift period setting unit falls to or below a predetermined charge, and an operation control unit for controlling an operation of the electrical equipment based on the operation start time or the operation termination time received by the reception unit.

According to the foregoing configuration, the input reception unit receives an input of desired time information indicating a desired operation start time or a desired operation termination time of an electrical equipment desired by a user. The transmission unit transmits the desired time information received by the input reception unit, operation period information indicating a period required for operating the electrical equipment, and electrical power information indicating an electrical power required for operating the electrical equipment. The electrical equipment control device receives the desired time information, the operation period information and the electrical power information transmitted from the transmission unit, sets a time-shift period indicating a period which has a time range including the desired time information and during which the operation start time or the operation termination time of the electrical equipment is shiftable, and computes, based on the desired time information, the operation period information and the electrical power information and electrical power charge information indicating an electrical power charge that changes hour to hour, the operation start time or the operation termination time where the electricity charge that is billed when the electrical equipment is operated within the time-shift period set by the time-shift period setting unit will fall below a predetermined charge. The reception unit receives the operation start time or the operation termination time transmitted from the electrical equipment control device. The operation control unit controls an operation of the electrical equipment based on the operation start time or the operation termination time received by the reception unit.

Accordingly, since the time-shift period has a time range including the desired time information indicating the desired operation start time or the desired operation termination time, the time-shift period is set to shift the operation start time or the operation termination time of the electrical equipment within the scope of its time range, and the operation start time or the operation termination time where the electricity charge that is billed when the electrical equipment is operated within the time-shift period set by the time-shift period setting unit will fall below a predetermined charge is computed. Consequently, a time-shift period exceeding the user's allowable range will no longer be set, and the user can enjoy the advantages of convenience and economic efficiency.

The electrical equipment according to still another aspect of the present invention comprises an input reception unit for receiving an input of desired time information indicating a desired operation start time or a desired operation termination time of an electrical equipment desired by a user, a time-shift period setting unit for setting a time-shift period indicating a period which has a time range including the desired time information received by the input reception unit and during which the operation start time or the operation termination time of the electrical equipment is shiftable, an electrical power charge information acquisition unit for acquiring electrical power charge information indicating an electrical power charge that changes hour to hour, an operation time computing unit for computing, based on the desired time information, the operation period information and the electrical power information received by the input reception unit and the electrical power charge information acquired by the electrical power charge information acquisition unit, the operation start time or the operation termination time where the electricity charge that is billed when the electrical equipment is operated within the time-shift period set by the time-shift period setting unit will fall below a predetermined charge, and an operation control unit for controlling an operation of the electrical equipment based on the operation start time or the operation termination time computed by the operation time computing unit.

According to the foregoing configuration, the input reception unit receives an input of desired time information indicating a desired operation start time or a desired operation termination time of an electrical equipment desired by a user. The time-shift period setting unit sets a time-shift period indicating a period which has a time range including the desired time information received by the input reception unit and during which the operation start time or the operation termination time of the electrical equipment is shiftable. The electrical power charge information acquisition unit acquires electrical power charge information indicating an electrical power charge that changes hour to hour. In addition, based on the desired time information, the operation period information and the electrical power information received by the input reception unit and the electrical power charge information acquired by the electrical power charge information acquisition unit, the operation time computing unit computes the operation start time or the operation termination time where the electricity charge that is billed when the electrical equipment is operated within the time-shift period set by the time-shift period setting unit will fall below a predetermined charge. The operation control unit controls an operation of the electrical equipment based on the operation start time or the operation termination time computed by the operation time computing unit.

Accordingly, since the time-shift period has a time range including the desired time information indicating the desired operation start time or the desired operation termination time, the time-shift period is set to shift the operation start time or the operation termination time of the electrical equipment within the scope of its time range, and the operation start time or the operation termination time where the electricity charge that is billed when the electrical equipment is operated within the time-shift period set by the time-shift period setting unit will fall below a predetermined charge is computed. Consequently, a time-shift period exceeding the user's allowable range will no longer be set, and the user can enjoy the advantages of convenience and economic efficiency.

Note that the specific embodiments and examples described in the section of Description of Embodiments are first and foremost for clarifying the technical contents of the present invention, and the present invention should not be narrowly interpreted by being limited such specific examples, and the present invention may be variously modified and implemented within the scope of the spirit and claims of the present invention.

Industrial Applicability

The electrical equipment control device, the electrical equipment control method and the electrical equipment according to the present invention allow the user to enjoy the advantages of convenience and economic efficiency, and are useful as an electrical equipment control device, an electrical equipment control method and an electrical equipment for controlling the operation start time or the operation termination time of the electrical equipment.

The invention claimed is:

1. An electrical equipment control device, comprising:
   a reception unit for receiving desired time information indicating a desired operation start time or a desired operation termination time of an electrical equipment desired by a user, operation period information indicating a period required for operation by the electrical equipment, and electrical power information indicating an electrical power required for operation by the electrical equipment;
   a time-shift period setting unit for setting a time-shift period indicating a period which has a time range including the desired time information received by the reception unit and during which the operation start time or the operation termination time of the electrical equipment is shiftable;
   an electrical power charge information acquisition unit for acquiring electrical power charge information indicating an electrical power charge that changes hour to hour;
   an operation time computing unit for computing, based on the desired time information, the operation period information and the electrical power information received by the reception unit and the electrical power charge information acquired by the electrical power charge information acquisition unit, the operation start time or the operation termination time, on the basis of which the electricity charge that is billed when the electrical equipment is operated within the time-shift period set by the time-shift period setting unit falls to or below a predetermined charge;

an operation determination unit for determining whether a state retention electrical energy that is consumed by the electrical equipment for retaining a post-operating state is greater than a predetermined value, wherein the time-shift period setting unit changes the time-shift period according to a determination result of the operation determination unit, wherein the time-shift period setting unit shortens the set time-shift period when the operation determination unit determines that the state retention electrical energy that is consumed by the electrical equipment for retaining post-operating state is greater than a predetermined value; and a transmission unit for transmitting, to the electrical equipment, the operation start time or the operation termination time computed by the operation time computing unit.

2. The electrical equipment control device according to claim 1, further comprising a confirmation unit for confirming an operating situation of another electrical equipment, wherein the time-shift period setting unit changes the time-shift period according to the operating situation of the other electrical equipment confirmed by the confirmation unit.

3. The electrical equipment control device according to claim 2, wherein the confirmation unit confirms an operation start time and an operation period of another electrical equipment, and the time-shift period setting unit changes the set time-shift period so that a period identified by the operation start time and the operation period of the other electrical equipment confirmed by the confirmation unit is not included.

4. The electrical equipment control device according to claim 1, further comprising an individual information acquisition unit for acquiring individual information that is unique to the electrical equipment, wherein the time-shift period setting unit sets the time-shift period according to the individual information acquired by the individual information acquisition unit.

5. An electrical equipment control method, comprising:

a reception step of receiving desired time information indicating a desired operation start time or a desired operation termination time of an electrical equipment desired by a user, operation period information indicating a period required for operation by the electrical equipment, and electrical power information indicating an electrical power required for operation by the electrical equipment;

a time-shift period setting step of setting a time-shift period indicating a period which has a time range including the desired time information received in the reception step and during which the operation start time or the operation termination time of the electrical equipment is shiftable;

an electrical power charge information acquisition step of acquiring electrical power charge information indicating an electrical power charge that changes hour to hour;

an operation time computing step of computing, based on the desired time information, the operation period information and the electrical power information received in the reception step and the electrical power charge information acquired in the electrical power charge information acquisition step, the operation start time or the operation termination time, on the basis of which the electricity charge that is billed when the electrical equipment is operated within the time-shift period set in the time-shift period setting step falls to or below a predetermined charge;

an operation determination step of determining whether a state retention electrical energy that is consumed by the electrical equipment for retaining a post-operating state is greater than a predetermined value, wherein the time-shift period setting step changes the time-shift period according to a determination result of the operation determination unit, wherein the time-shift period setting step shortens the set time-shift period when the operation determination unit determines that the state retention electrical energy that is consumed by the electrical equipment for retaining post-operating state is greater than a predetermined value; and a transmission step of transmitting, to the electrical equipment, the operation start time or the operation termination time computed in the operation time computing step.

6. An electrical equipment, comprising:

an input reception unit for receiving an input of desired time information indicating a desired operation start time or a desired operation termination time of an electrical equipment desired by a user;

a transmission unit for transmitting the desired time information received by the input reception unit, operation period information indicating a period required for operation by the electrical equipment, and electrical power information indicating an electrical power required for operation by the electrical equipment;

a reception unit for receiving the operation start time or the operation termination time transmitted from an electrical equipment control device which receives the desired time information, the operation period information and the electrical power information transmitted from the transmission unit, sets a time-shift period indicating a period which has a time range including the desired time information and during which the operation start time or the operation termination time of the electrical equipment is shiftable, and computes, based on the desired time information, the operation period information and the electrical power information and electrical power charge information indicating an electrical power charge that changes hour to hour, the operation start time or the operation termination time, on the basis of which the electricity charge that is billed when the electrical equipment is operated within the time-shift period falls to or below a predetermined charge; and an operation control unit for controlling an operation of the electrical equipment based on the operation start time or the operation termination time received by the reception unit, wherein the electrical equipment control device changes the time-shift period according to whether a state retention electrical energy that is consumed by the electrical equipment for retaining a post-operating state is greater than a predetermined value, wherein the electrical equipment control device shortens the set time-shift period when the state retention electrical energy that is consumed by the electrical equipment for retaining post-operating state is greater than a predetermined value.

7. An electrical equipment, comprising:
- an input reception unit for receiving an input of desired time information indicating a desired operation start time or a desired operation termination time of an electrical equipment desired by a user;
- a time-shift period setting unit for setting a time-shift period indicating a period which has a time range including the desired time information received by the input reception unit and during which the operation start time or the operation termination time of the electrical equipment is shiftable;
- an electrical power charge information acquisition unit for acquiring electrical power charge information indicating an electrical power charge that changes hour to hour;
- an operation time computing unit for computing, based on the desired time information, the operation period information and the electrical power information received by the input reception unit and the electrical power charge information acquired by the electrical power charge information acquisition unit, the operation start time or the operation termination time, on the basis of which the electricity charge that is billed when the electrical equipment is operated within the time-shift period set by the time-shift period setting unit falls to or below a predetermined charge; and
- an operation control unit for controlling an operation of the electrical equipment based on the operation start time or the operation termination time computed by the operation time computing unit; and
- an operation determination unit for determining whether a state retention electrical energy that is consumed by the electrical equipment for retaining a post-operating state is greater than a predetermined value, wherein the time-shift period setting unit changes the time-shift period according to a determination result of the operation determination unit, wherein the time-shift period setting unit shortens the set time-shift period when the operation determination unit determines that the state retention electrical energy that is consumed by the electrical equipment for retaining post-operating state is greater than a predetermined value.

* * * * *

UNITED STATES PATENT AND TRADEMARK OFFICE
CERTIFICATE OF CORRECTION

PATENT NO. : 8,983,633 B2  Page 1 of 1
APPLICATION NO. : 13/822167
DATED : March 17, 2015
INVENTOR(S) : Kouda et al.

It is certified that error appears in the above-identified patent and that said Letters Patent is hereby corrected as shown below:

Title Page

Item (73) Assignee:

"Panasonic Corporation" should be deleted and replaced with
-- PANASONIC INTELLECTUAL PROPERTY MANAGEMENT CO., LTD. --.

Signed and Sealed this
Twenty-fifth Day of August, 2015

Michelle K. Lee
*Director of the United States Patent and Trademark Office*